United States Patent [19]

Doli, Jr. et al.

[11] Patent Number: 5,490,276
[45] Date of Patent: Feb. 6, 1996

[54] PROGRAMMING LANGUAGE STRUCTURES FOR USE IN A NETWORK FOR COMMUNICATING, SENSING AND CONTROLLING INFORMATION

[75] Inventors: Robert A. Doli, Jr., Menlo Park; Robert L. Einkauf, Fremont; Glen M. Riley, Los Gatos, all of Calif.

[73] Assignee: Echelon Corporation, Palo Alto, Calif.

[21] Appl. No.: 397,552

[22] Filed: Mar. 1, 1995

Related U.S. Application Data

[63] Continuation of Ser. No. 111,011, Aug. 23, 1993, abandoned, which is a continuation of Ser. No. 671,117, Mar. 18, 1991, abandoned.

[51] Int. Cl.⁶ .............................. G06F 15/46; G06F 9/45
[52] U.S. Cl. ................ 395/700; 395/200.01; 364/921.4; 364/922.96; 364/940; 364/940.14; 364/280.4; 364/284.4; 364/DIG. 2; 364/973
[58] Field of Search .............................................. 395/700

[56] References Cited

U.S. PATENT DOCUMENTS

| | | | |
|---|---|---|---|
| 3,582,901 | 6/1971 | Cochrane et al. | 340/172.5 |
| 4,007,450 | 2/1977 | Haibt et al. | 364/200 |
| 4,386,416 | 5/1983 | Giltner et al. | 364/900 |
| 4,554,418 | 11/1985 | Toy | 179/2 DP |
| 4,570,217 | 2/1986 | Allen et al. | 364/188 |
| 4,589,063 | 5/1986 | Shah et al. | 364/200 |
| 4,635,189 | 1/1987 | Kendall | 364/200 |
| 4,654,654 | 3/1987 | Butler et al. | |
| 4,720,782 | 1/1988 | Kovalcin | 364/200 |
| 4,727,575 | 2/1988 | Hansen et al. | 379/94 |
| 4,730,348 | 3/1988 | MacCrisken | 375/122 |
| 4,843,545 | 6/1989 | Kikuchi | 364/300 |
| 4,885,684 | 12/1989 | Austin et al. | 364/300 |
| 4,926,375 | 5/1990 | Mercer et al. | 364/900 |
| 4,937,760 | 6/1990 | Beitel et al. | 364/513 |
| 4,972,367 | 11/1990 | Burke | |
| 4,974,151 | 11/1990 | Advani et al. | 364/200 |
| 5,093,916 | 3/1992 | Karp et al. | 395/700 |
| 5,159,685 | 10/1992 | Kung | 395/575 |
| 5,175,691 | 12/1992 | Baker et al. | 364/478 |

FOREIGN PATENT DOCUMENTS

| | | | |
|---|---|---|---|
| 0412232 | 2/1991 | European Pat. Off. | G06F 9/46 |
| 9015394 | 12/1990 | WIPO | G06F 15/46 |
| 9103017 | 3/1991 | WIPO | G06K 13/00 |

*Primary Examiner*—Kevin A. Kriess
*Assistant Examiner*—Lucine U. Toplu
*Attorney, Agent, or Firm*—Blakely, Sokoloff, Taylor & Zafman

[57] ABSTRACT

An improved programming interface which provides for event scheduling, improved variable declarations allowing for configuration of declaration parameters, and improved handling of I/O objects. In modern day computing devices and especially in networks of such devices it is important to provide for event scheduling; known computing devices allow for event scheduling based on the occurrence of a predefined event. However, such a system present shortfalls in that flexibility is not provided to allow scheduling based on any arbitrary condition. Therefore, it is disclosed to provide a programming environment which allows for event scheduling where the event may be any arbitrary condition thus providing increased flexibility in event driven programs. In addition, programs which run on such computing devices typically declare one or more variables; such variables having one or more parameters associated therewith. These parameters are set to a state by the programmer, which state presumably is the state expected by the programmer to be the optimal state. The present invention provides flexibility in allowing such states to be changed, for example at the time a network implementing the computing device is configured. Additionally, it is disclosed to have improved declaration and control of I/O devices providing for ease of use and flexibility.

19 Claims, 14 Drawing Sheets

PROGRAMMING LANGUAGE STRUCTURES FOR USE IN A NETWORK FOR COMMUNICATING, SENSING AND CONTROLLING INFORMATION

This is a continuation of application Ser. No. 08/111,011, filed Aug. 23, 1993, which is a continuation of application Ser. No. 07/771,117, filed Mar. 18, 1991 which are both abandoned.

BACKGROUND OF THE INVENTION

1. Field of the Invention

The present invention relates to the field of systems for distributed computing, communication and control and, more specifically, communication of information between devices in a distributed computing environment.

2. Description of the Related Art

In distributed computer systems it is necessary to provide for communication of information between nodes in the system. A number of methods for providing such communication are known in the art.

These methods include message passing techniques in which messages are passed, over a medium, from one node to another in a network. In message passing techniques, messages are built by a sender node and sent to one or more receiver nodes. The message is then parsed by the receiver node in order to correctly interpret the data. Message passing allows the advantage of passing large mounts of data in an expected format. Of course, over time the format of the message may be required to change to support new applications or features. This typically leads to compatibility issues between nodes on the network.

A second technique involves remote procedure calls in which a first node, requiring data which exists on a second node, calls a procedure executing on the second node where the data exists and requests the procedure to manipulate the data and provide a result to the first node. Remote procedure calls are typically suited to passing small mounts of data; however, a separate procedure call is typically required for each interchange. Therefore, it is likely in any networking system that over time additional procedure calls will be required in the network as new functions are carded out by the network. The addition of new procedure calls to certain nodes of the network leads to incompatibility between nodes, because the existing nodes do not know of and cannot execute the new remote procedure calls.

A third technique for communication of data in a network involves data sharing. Bal, Henri E., Steiner, Jennifer G., and Tanenbaum, Andrew S., *Programming Languages for Distributed Computing Systems*, ACM Computing Surveys, Vol. 21, No. 3, September, 1989, pp. 261–322 (hereinafter Bal et al.) describes certain data sharing techniques. A discussion of data sharing may be found in the Bal et al, article at pages 280, et seq. (It should also be noted that a discussion of messaging may be found in the Bal et al. article at pages 276, et seq. along with a general overview of interprocess communication and synchronization.)

Bal et at. describes how pans of a distributed program can communicate and synchronize through use of shared data. Bal et al. states that, if two processes have access to the same variable, communication can take place by one processor setting the variable and the other processor reading the variable. This communication is described as being allowed to take place whether the two processors are both running on a host where the shared data is stored and thus can manipulate the shared data directly, or if the processes are running on different hosts and access to the shared data is accomplished by sending a message to the host on which the shared data resides.

Two types of shared data are described: (1) shared logical variables; and (2) distributed data structures. Briefly, shared logical variables are described as facilitating a communication channel between processes through a "single-assignment" property. Initially, a shared logical variable is unbound, but once a value is assigned to the variable the variable is considered to be bound. An example is provided in which the three goals of conjunction:

goal_1 (X, Y), goal_2 (X, Y), and goal_3 (X)

are assumed and solved in parallel by processes P1, P2 and P3. The variable X is initially unbound and represents a communication channel between the three processes. If any of the processes binds X to a value, the other processes can use this value. Likewise, Y is a channel between P1 and P2. Processes synchronize by suspending on unbound variables. For example, if Y is to be used to communicate information from P1 to P2, then P2 may suspend until Y is bound by P1.

It should be emphasized that in the described concept of shared logical variables, the term binding is used to describe a process of assigning a value to a variable. As will be seen below, the term binding is also used to describe the present invention, however, the meaning of the term is significantly different and the reader is cautioned to avoid confusion between the concepts represented by these two uses of this term. Generally, in the present invention, the term binding is used to indicate a process of associating a variable of one node with a variable of at least one other node. It is not necessary that the variable of either node has yet been assigned a data value.

Distributed data structures are data structures which may be manipulated simultaneously by several processes. In concept, all processes share one global memory termed "tuple space" or TS. The elements of TS are ordered sequences of values, similar to records in a language such as Pascal. Three operations may take place on TS: (1) "OUT" adds a tuple to TS; (2) "READ" reads a tuple from TS; and (3) "IN" reads a tuple from TS and deletes it from TS. Thus, in order to change the value of a tuple in TS it is necessary to fast perform an IN operation, then to manipulate the data, and then perform an OUT operation. The requirement that a tuple must first be removed by the IN operation makes it possible to build distributed systems without conflict between accesses by the various processes.

Bal et al. contrasts distributed data structures with interprocess communication techniques noting that communication accomplished by distributed data structures is anonymous. A process reading a tuple from TS does not know or care which other process inserted the tuple. Further, a process executing an OUT does not specify which process the tuple is intended to be read by.

Bal et al. states that in concept distributed data structures utilizing the tuple space implement conceptually a shared memory, although in implementation a physical shared memory is not required. However, as can be seen, in a system utilizing such distributed data structures a single copy of the data is stored in tuple space whether or not such tuple space is implemented as a single physical shared memory. Separate copies of the data are not maintained for the various processes or on the various hosts. In fact, maintaining separate copies would lead to data conflict possibilities as the various nodes attempted to coordinate updates of the variable between the various process and hosts. Thus, the reason for requiring use of the IN command to delete a tuple before allowing manipulation of the data represented by the tuple.

The present invention discloses a networked communication system which is perhaps closest in certain concepts to the described distributed data structures. However, it can, of course, be appreciated that certain advantages may be gained from development of a system which utilizes certain features of distributed data structures while retaining flexibility in allowing multiple copies of a data value to be stored on the various nodes.

The present invention discloses certain improved programming language and data structure support for communication, sensing and control as may be used by nodes of the present invention. It is known in the art to allow for scheduling of tasks through use of a programming statement such as a "when" clause or the like. However, in known systems such tasks may only be scheduled to be executed on the occurrence of a predefined event such as may be defined by the compiler writer. Examples of such events typically include expiration of a timer or input pin state changes. Such known systems do not allow for definitions of events, other than such predefined events. It has been discovered that it is useful to provide for definition of events as any valid programming language statement which may be evaluated to a true or false condition.

Of course, any number of known systems allow for declaration of variables and when declaring such variables certain parameters may be specified which may be set to a state indicative of a desired characteristic of the variable. For example, a variable may be declared as input or output, as a given variable type (e.g., boolean, numeric, etc.). However, once declared such characteristics are static and may only be changed by changing the source program which declares the variables. It has been discovered that it would be useful to provide for a system in which the state of at least certain parameters may be changed during system configuration allowing for greater flexibility in optimizing the system of the preferred embodiment.

Finally, in known systems it is necessary to call certain I/O library procedures to declare and use I/O devices. Such calls to I/O procedures may be quite complex and require significant skill on the part of the programmer to properly code and utilize the routines. The present invention discloses a system having improved methods for declaration and use of I/O devices.

OBJECTS OF THE PRESENT INVENTION

It is a primary object of the present invention to provide for improved communication of information between nodes of a distributed network.

It is more specifically an object of the present invention to provide for improved communication of information in a highly distributed computer system in which a problem may be broken down into small units in which each node accomplishes a small part of the entire application. In such a system, data communication may be typically accomplished in relatively small units of data-however, significant communication of data between nodes of the network is required.

It is further an object of the present invention to provide for improved communication of information in a distributed computing system by allowing for standard communication techniques between nodes.

It is still further an object of the present invention to provide for improved communication of information by providing certain facilities, structures and tools for such communication.

It is also an object of the present invention to provide improved data structures and programming language support for communication and other aspects of the present invention.

As one aspect of providing such improved data structures and programming language support, it is one aspect of the present invention to provide for declaration of variables having configurable parameters leading to improved ability to maintain and optimize networks of the present invention.

As another aspect of providing such improved data structures and programming language support, it is desired to provide for increased ease in declaring and communicating with I/O devices of the present invention.

As still another aspect of providing such improved data structures and programming language support, it is desired to provide for improved scheduling functions allowing for use of programmer-defined or predefined events in scheduling of tasks to be executed.

It is also an object of the present invention to provide simplified installation and network maintenance. Such an objective may be accomplished by storing in each node the node's application interface such that nodes may identify themselves and their application requirements to a network management node at installation time and when it is necessary to recover the complete network database.

To accomplish such a simplified installation and maintenance objective, it is a further objective of the present invention to define an interface file format which may efficiently store and allow retrieval of such identification and application requirement information.

These and other objects of the present invention will be better understood with reference to the Detailed Description of the Preferred Embodiment, the accompanying drawings, and the claims.

SUMMARY OF THE INVENTION

A network for communicating information having at least a first and second node is described in which each node includes data storage for storing data representing a variable V and further includes a processor coupled with the data storage. In the case of the first node, the processor may manipulate and write to new values to the variable V. After having updated the variable V with a new value, the processor then assembles and communicates a packet for transmission on the network. The packet includes the new data value for the variable V. The second node then receives the packet and stores the new value for the variable V in its data storage.

In particular, during programming of the first node, it is declared as a writer of the variable V and likewise during programming of the second node, it is declared as a reader of the variable V. During configuration of the network, a communication connection between the first node and the second node is defined and during later communication of message packets, addressing of message packets between the various nodes is accomplished through use of address tables based on the definition of such connections.

Further, it is disclosed to utilize a standardized set of variable types in accomplishing such communication. Use of a standardized set of variable types leads to increased compatibility between nodes of different manufacture as well as increased ease in configuring networks.

Finally, certain extensions are provided to standard programming languages to provide for increased ease of use of the data communication features of the present invention.

These and other aspects of the present invention will be apparent to one of ordinary skill in the art with further reference to the below Derailed Description of the Preferred Embodiment and the accompanying drawings.

Figure 1:
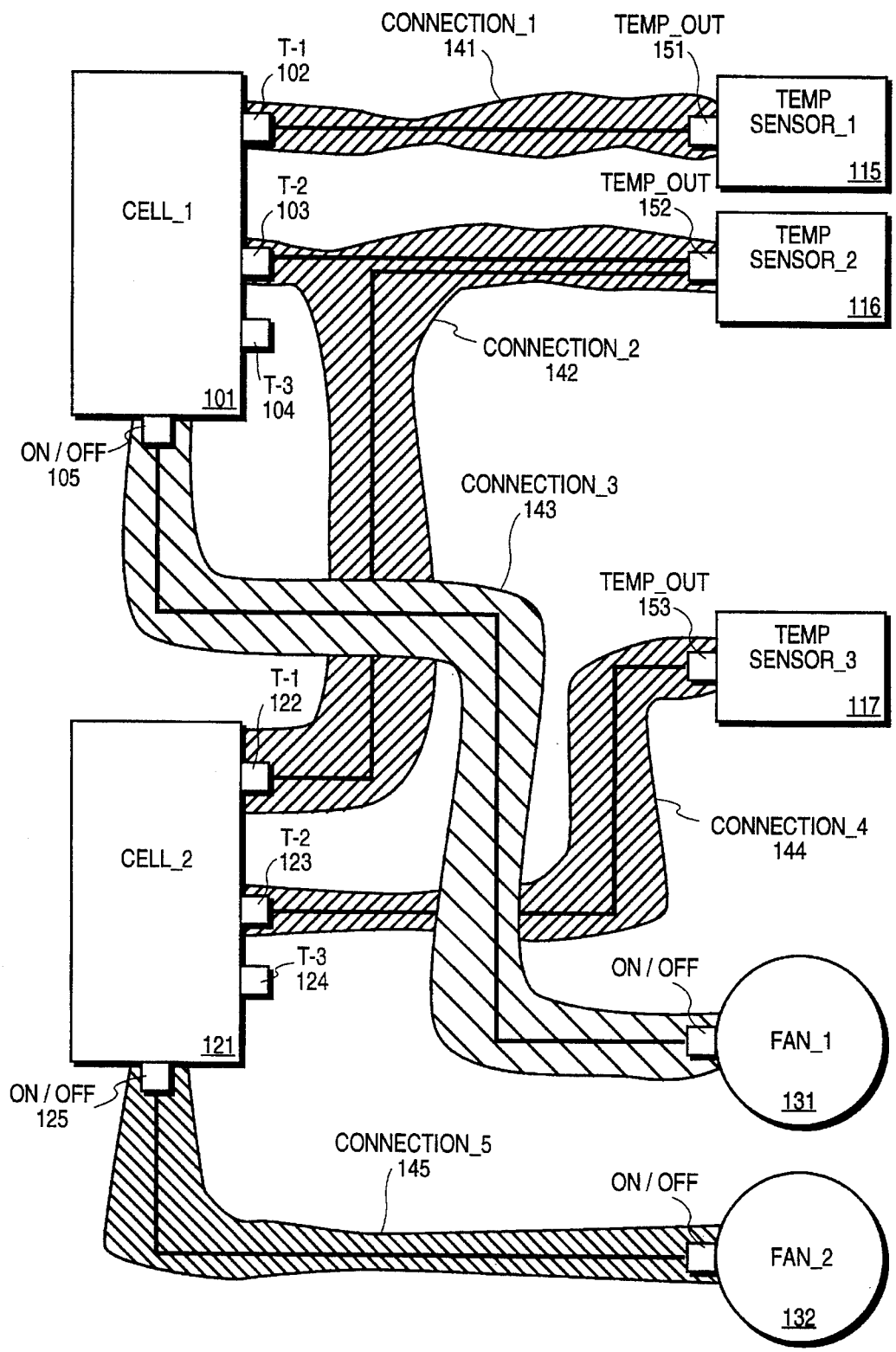
FIG. 1 is a logical view of a configuration of devices as may be networked using methods and apparatus of the present invention.
Figure 9:
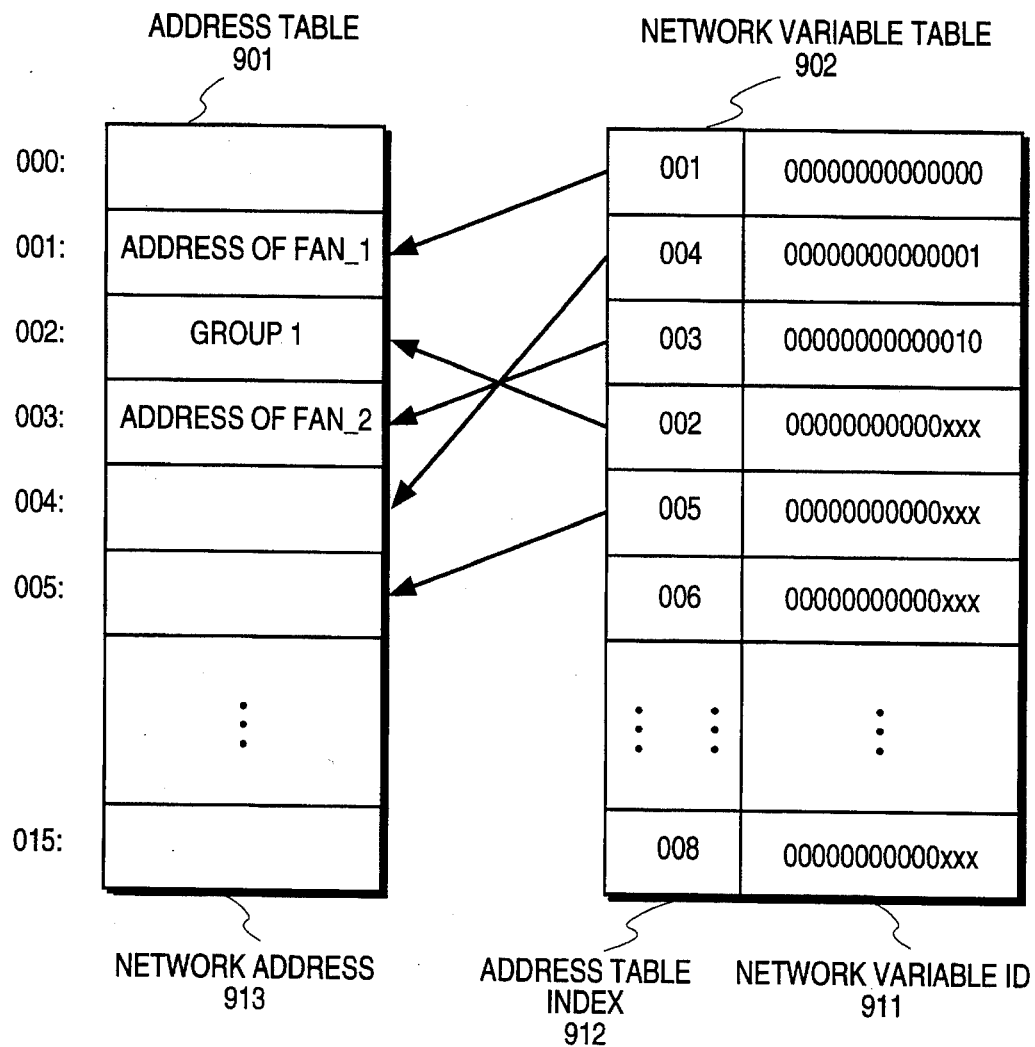
FIG. 9 is an illustration of certain data structures which may be utilized by the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 9, reference numerals may be numbered 9xx. In certain cases, a reference numeral may be introduced on one drawing, e.g., reference numeral 201 illustrating a communication medium, and the same reference numeral may be utilized on other drawings to refer to the same item.

DETAILED DESCRIPTION OF THE PREFERRED EMBODIMENT

An improved computer network including facility for communication of information between nodes in the network is described. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW OF THE NETWORK OF THE PRESENT INVENTION

The network of the preferred embodiment is of the type which provides for sensing, control and communication. The network of the present invention and nodes utilized within the network of the present invention are described in greater detail with reference to U.S. Pat. No. 4,918,690 Markkula et al. titled "Network and intelligent cell for providing sensing, bi-directional communications and control", which patent is assigned to the assignee of the present invention (referred to herein as the '690 patent).

In an exemplary network, the network of the present invention may provide for sensing of current environmental factors and control of apparatus affecting the environmental factors. Further, the network may allow for communication of information packets providing information on the environmental factors between nodes in the network. The present application will utilize, as an example, a network for control of fans based on sensing and communicating information regarding temperature in different zones in a controlled environment It might be worthwhile noting that in an expected scenario, various manufacturers will include a node of the type defined by the present invention in their products. For example, a thermostat manufacturer may include such a node in its thermostats. A fan manufacturer may include such a node in its fans. The various nodes may be programmed for specific applications by their respective manufacturers and, when configured in an environmental control system, are useful for communication, sensing and control between various components of the system. A node of the preferred embodiment is illustrated in block diagram form with reference to FIG. 4. Such nodes may be programmed, for example, using the "C" computer programming language. As one aspect of the present invention, certain extensions have been provided to the "C" language to facilitate network communications.

As a further and important aspect of the present invention, network variables are described which provide for communication of information between nodes of the network. A network variable may be thought of as a data object shared by multiple nodes where some nodes are "readers" and some nodes are "writers" of the object. This will be discussed in greater detail below.

A network as may be implemented utilizing the present invention

Referring now to FIG. 1, a logical view of a network as may utilize the present invention is shown. The network may, for example, include three separate temperature sensors 115–117 located in three separate zones of a building for sensing and communicating temperature information. The network may further include two control cells 101 and 121 coupled to receive temperature information from the sensors 115–117 and to control two fans 131–132 (by turning the fans 131–132 on and off).

In the exemplary network, network variable temp_out 151 is coupled to a first network variable temperature input 102 of control cell 101. Network variable temp_out 152 is coupled with a second network variable temperature input 104 of control cell 101. In the illustrated embodiment, a third network variable temperature input 103 is not utilized. On/Off control network variable 105 of control cell 101 is coupled to control an input network variable, On/Off, of a fan 131. Thus, in this embodiment, sensing a temperature above a given level in the zone of the building sensed by temperature sensor 115 or by temperature sensor 116 will cause fan 131 to be turned on. Likewise, when the temperature in these zones is again lowered below a given level, the fan 131 may be turned off.

Network variable temp_out 152 is also coupled to a first temperature input network variable 122 of control cell 121. In addition, network variable temp_out 153 is coupled to a second temperature input network variable 123 of control cell 121. A third temperature input 124 of control cell 121 is not utilized in this embodiment. Control cell 121 is coupled through an On/Off control output network variable 125 to control fan 132. Thus, sensing a temperature above a given level in the zone of the building sensed by temperature sensor 116 or by temperature sensor 117 will cause fan 132 to be turned on. Likewise, when the temperature in these zones is again lowered below a given level, the fan 132 may be turned off. As is appreciated, in the described configuration, when temperature sensor 116 detects a high temperature, both fan 131 and fan 132 are turned on.

FIG. 1 has been labeled to illustrate logical connections between the various components. Connection 141 is illustrated as the connection between temperature sensor 115 and control cell 101. Connection 142 is illustrated as the connection including temperature sensor 116, control cell 101 and control cell 121. Connection 143 is illustrated as the connection between control cell 101 and fan 131. Connection 144 is illustrated as the connection between sensor 117 and control cell 121. Connection 145 is illustrated as the connection between control cell 121 and fan 132. The connection of network variables will be discussed in greater detail below. However, it may now be useful to introduce three new terms: network variables, readers, and writers. In addition, general definitions for certain other terms used in this specification may be found with reference to Table XV.

As one important aspect of the present invention, the present invention provides for allocation and use of network variables by processes running on nodes in a network. As stated above, network variables may be thought of as a data object shared by multiple nodes where some nodes are "readers" of the object and other nodes are "writers" of the object Additionally, a node may be both a reader and a writer with "turnaround". Writing with turnaround is discussed in greater detail below. Although the data object may be thought of as being shared by multiple nodes, as will be understood from the discussion below, the network variable of the preferred embodiment is not stored in shared memory but rather separate memory is provided in each of the multiple nodes to store a copy of the data object. A writer node may modify the value of the data object and all reader nodes of that network variable have their memories updated to reflect the change. Thus, for example, each of the temperature sensors 115–117 may run a process which declares a data object as follows:

network output boolean temp_high.

Each of the controller cells 101 and 121 may declare dam objects as follows:

network input boolean temp_high network output boolean fan_on.

Each of the fans 131–132 may declare a dam object as follows:

network input boolean fan_on.

The complete syntax for declaration of network variables in the system of the preferred embodiment is given in Table VIII. The keyword "network" indicates the data object is a network variable. A network variable declared as output will result in transmission of the new value of the network variable on the network when the program stores the variable—thus, nodes having declared an output network variable are considered writer nodes for that variable. For example, each time a process running on temperature sensor 115 stores the variable temp_high, a network message is generated communicating the new value of temp_high. The message is communicated to all reader nodes connected in connection_1 141, i.e., to control cell 101. In the case of temperature sensor 116 changing the value of its temp_high variable, a message is generated and transmitted to all nodes connected in connection_2 142, i.e., to both control cell 101 and to control cell 121. The process for configuring connections as disclosed by the present invention will be discussed in greater detail below.

Although the preferred embodiment declares nodes as either writers or readers of network variables, it should be noted that in an alternative embodiment a node may be declared as a both a reader and writer of a particular variable. Such an embodiment may be envisioned without departure from the spirit and scope of the present invention.

It might be that the present invention in its preferred embodiment allows an output network variable to be initialized using an initialization command without causing a message to be transmitted on the network. Using this command, a node may be initially configured or reset without affecting other nodes on the network.

Network variables declared as input may change values asynchronously with program execution-this declaration is used for "reader" nodes. In the preferred embodiment, input network variables may also change values at program initialization or at other points under program control; however, the changed value will not be transmitted on the network.

At anytime, a reader node may force an update of its input network variables utilizing a polling function of the present invention. When this function is called, the specified network variables are updated by requesting over the network the current value from the writer node or nodes. This facility may be useful, for example, after a node reset to allow the node to determine the current value of network variables without need to wait until the next time the writer nodes update the value of those variables.

Thus, temperature sensors 115–117 are writer nodes of the variable temp_high. Control cells 101 and 121 are reader nodes of the variable temp_high and also are writer nodes of the variable fan_on. Fans 131–132 are reader nodes of the variable fan_on.

Of course, many other applications and configurations are within the scope of the teachings of the present invention and the network described with reference to FIG. 1 is merely exemplary.

It should be noted that multiple readers and multiple writers may be provided within a single connection without departure from the spirit and scope of the present invention.

Multiple readers are illustrated with reference to connection_2 142. Multiple writers have not been illustrated by FIG. 1. However, variation in which multiple writers are employed will be readily apparent to one of ordinary skill in the art.

Figure 2:
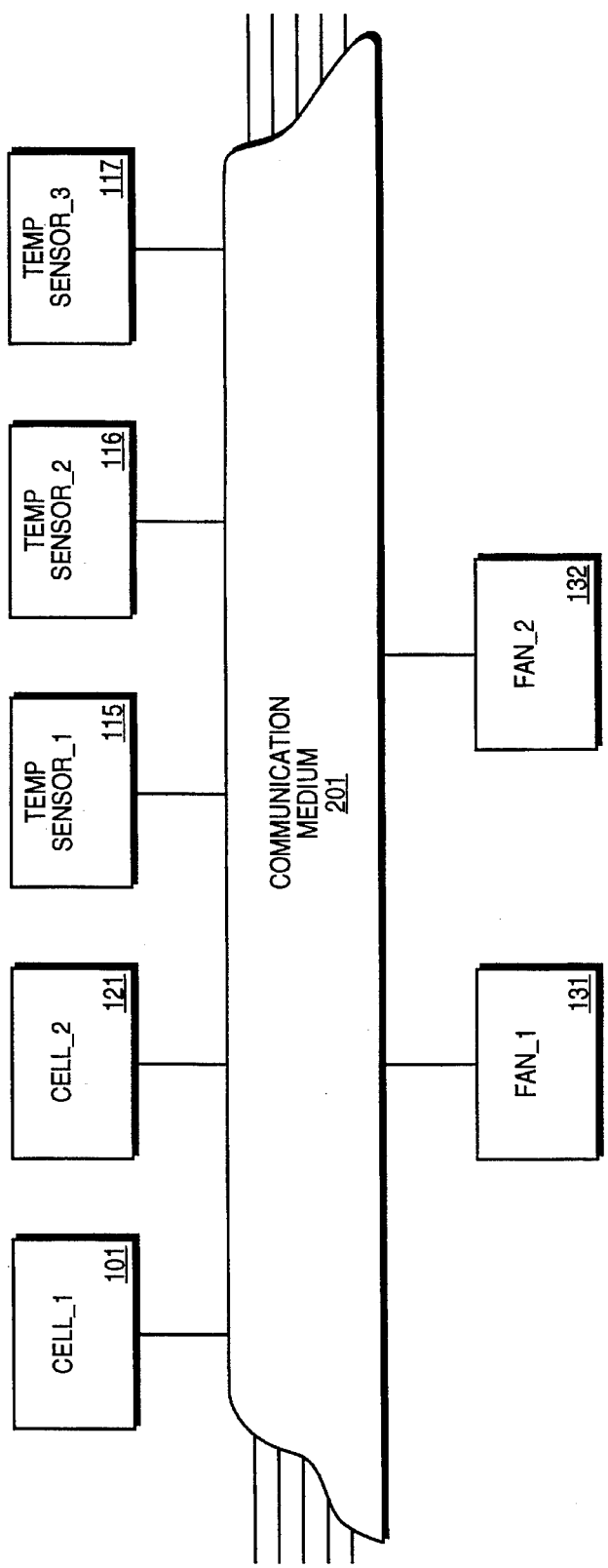
FIG. 2 is a diagram illustrating an embodiment of the network of FIG. 1 as may be accomplished by the present invention.

Turning to FIG. 2, an embodiment of the network of FIG. 1 is illustrated in which each of cell 101, cell 121, temperature sensor 115, temperature sensor 116, temperature sensor 117, fan 131 and fan 132 are each coupled to communicate over common communication medium 201. The communication medium 201 may be, for example, twisted pair wiring, radio frequency, power lines, or other communication channels or multiple physical channels connected together with bridges and/or routers. In this embodiment, and in order to accomplish the connections illustrated by FIG. 1, temperature sensor 115 must be configured to address and communicate with cell 101; temperature sensor 116 must be configured to address and communicate with cell 101 and cell 121; temperature sensor 117 must be configured to address and communicate with cell 121; control cell 101 must be configured to address and communicate with fan 131; and control cell 121 must be configured to address and communicate with fan 132.

Of course, providing for such addressing may be and typically is a significant task. It is appreciated that each of control cells 101 and 121, temperature sensors 115–117 and fans 131–132 may be engineered, programmed and/or manufactured by different sources. Further, although the exemplary network is, in itself, complicated having 5 separate connections, 141–145, it can of course be imagined that other networks may be substantially more complicated having even hundreds or more connections. Therefore, the present invention implements methods and apparatus which allow for straightforward and efficient configuration of nodes in a network.

Figure 3A:
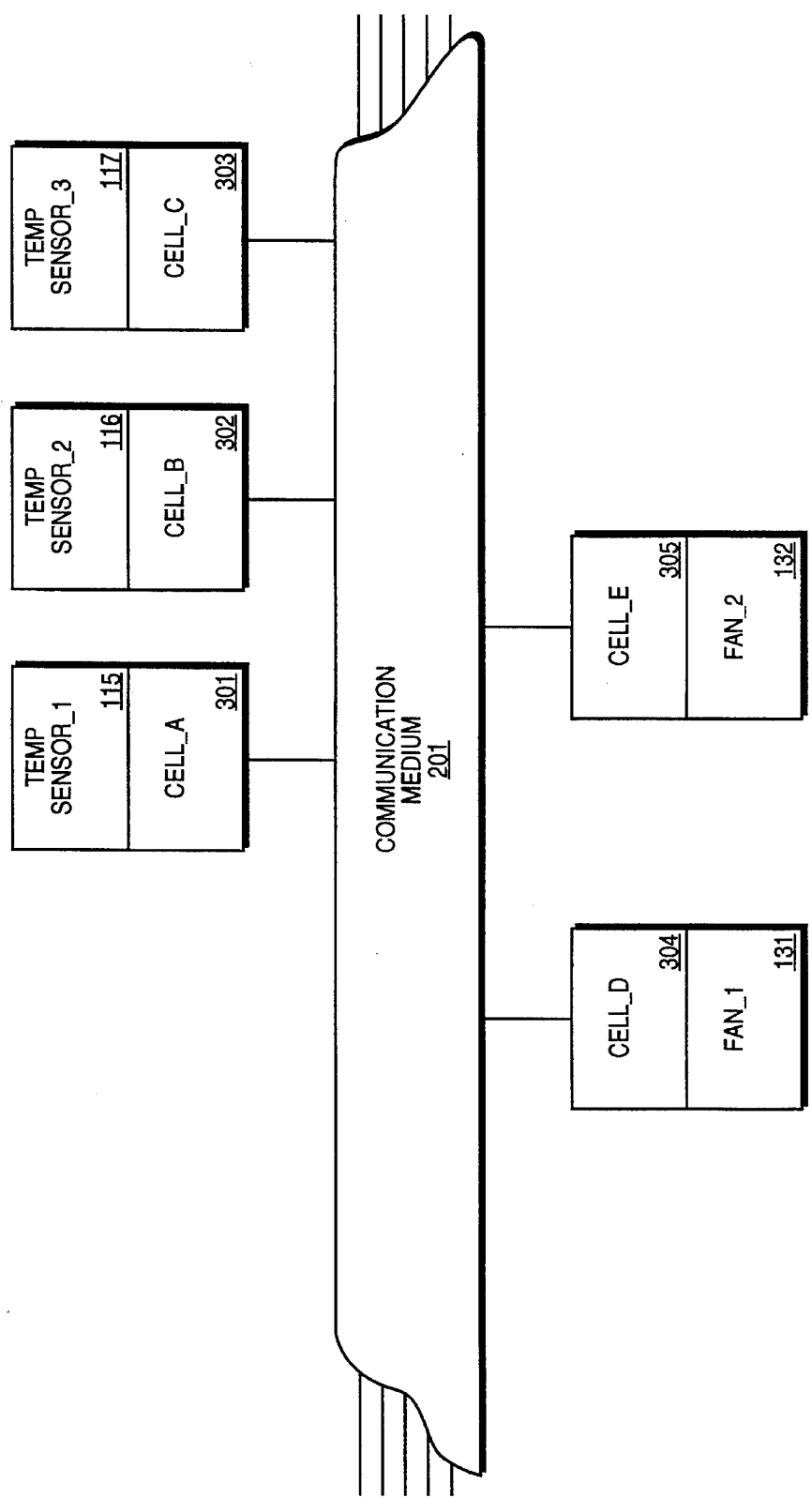
FIG. 3(a) is a diagram illustrating a second embodiment of the network of FIG. 1 as may be accomplished by the present invention.

Turning now to FIG. 3(a), a modified embodiment of the configuration of FIG. 2 is illustrated. In this embodiment, controller cells 101 and 121 have been removed from the configuration and each of temperature sensors 115–117 and fans 131–132 are illustrated as comprising nodes 301–305, respectively. These nodes are preferably of the type which are capable of sensing, communicating and controlling as have been described in the '690 patent and which are shown in greater detail with reference to FIG. 4. Thus, these nodes 301–305 are capable of replacing certain control functions of the control cells 101 and 121, eliminating the need for separate control cells in the described embodiment. In the embodiment of FIG. 3(a), and in order to accomplish the logical connections illustrated by FIG. 1, node 301 must be configured to communicate with node 304; node 302 must be configured to communicate with nodes 304 and 305; and node 303 must be configured to communicate with node 305. Again it is important to note that the temperature sensors 115–117 and fans 131–132 may be manufactured by different sources. It is preferable that the manufacturing sources are not required to have prior knowledge as to what devices their products will communicate with in a network. Thus, the manufacturer of temperature sensor 115 is preferably not required to be aware, during programming and manufacture of temperature sensor 115, whether temperature sensor 115 will be configured in a network to communicate with a controller cell, such as controller cell 101 (as shown in FIG. 2), or to communicate directly with a fan, such as fan 131 (as shown in FIG. 3(a)), or even with some other device (perhaps a heater, air conditioner, fire extinguishing equipment, etc.). Likewise, it is preferable that the manufacturer of fans 131–132 are similarly allowed to manufacture devices without requirement of prior knowledge as to the eventual uses of those devices in a network.

In order to allow for such flexibility in configuring networks and to allow for efficient communication between nodes in a network, the present invention provides network variables which may be used to facilitate standards of communication between nodes in the network.

Table I illustrates a temperature sensor control program as may be used to program nodes 301–303 coupled with temperature sensors 115–117. As can be seen, the program of Table I is written to communicate onto the medium 201 a network variable indicative of the state of temp_in. The value of this variable may be, for example, used by a control program running on a control cell, such as control cell 101 or 121, or used directly by a control program running on a fan, such as fans 131–132.

Table II illustrates a fan control program which may be used for controlling a fan such as fans 131–132 by mining the fan on and off responsive to receiving changes in state of a network variable on_off. As can be seen, the program of Table II is written to allow receiving from the medium 201 the network variable on_off as a binary network variable regardless of the source (e.g., whether from a control cell such as control cell 101 or 121, or directly from a temperature sensor, such as temperag sensor 115–117).

Figure 3B:
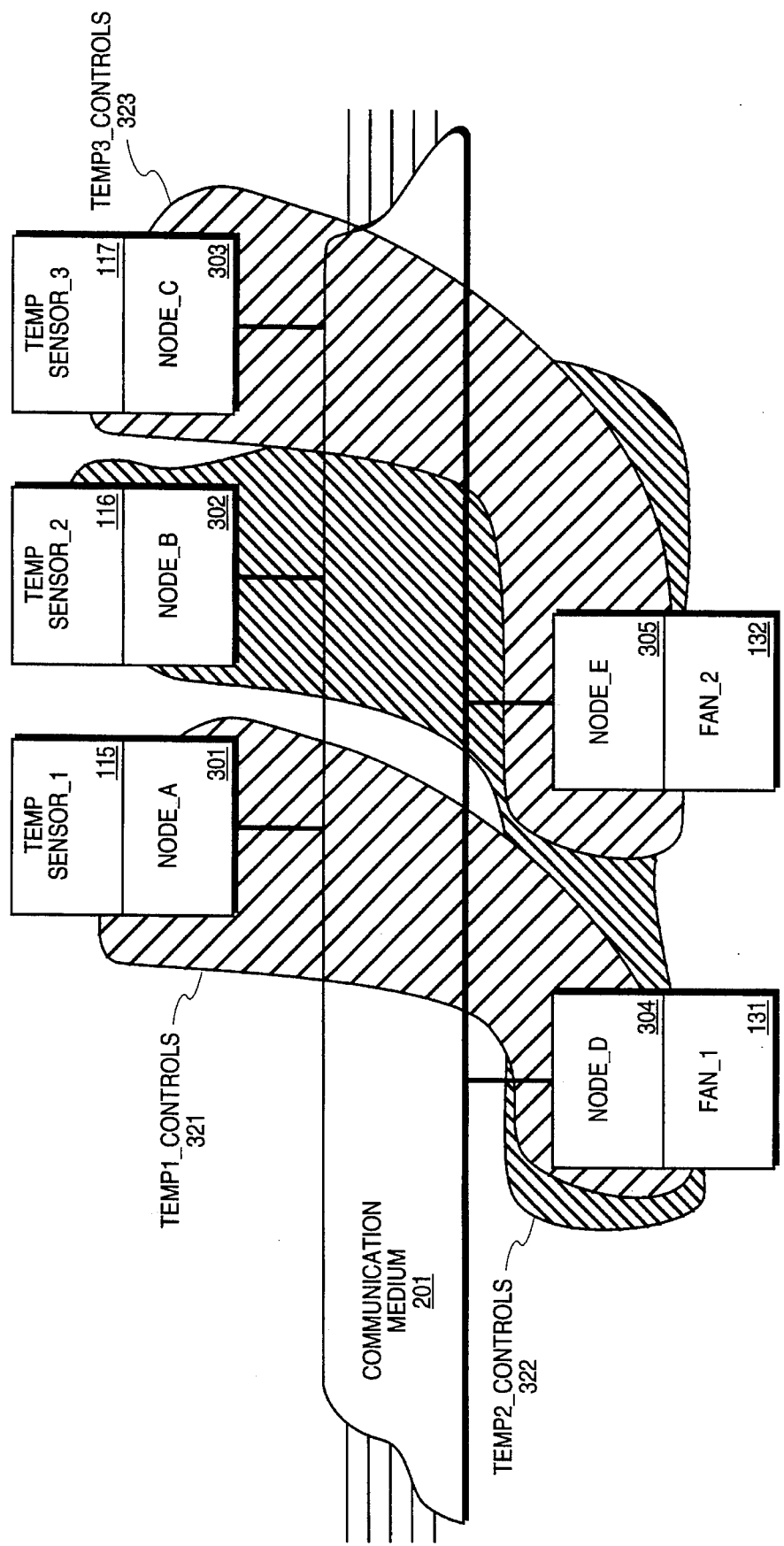
FIG. 3(b) is a second diagram illustrating the second embodiment of FIG. 3(a) and including a logical view of certain connections of nodes of the network.

Table III illustrates a binding set which connects temperag sensors 115–117 with fans 131–132 as illustrated by FIG. 3(a). FIG. 3(b) is provided to further an understanding of the binding set. As can be seen, the binding set provides for three connections illustrated as temp1_controls 321, temp2_controls 322, and temp3_controls 323 of FIG. 3(b). The connection temp1_controls connects the output variable temp_high of temperature sensor 115 with the input variable fan_on of fan_1 131. The connection temp2_controls connects the output variable temp_high of temperature sensor 116 with the input variable fan_on of both fan_1 131 and fan_2 132. Finally, the connection temp3_controls connects the output variable temp_high of temperature sensor 117 with the input variable fan_on of fan_2 132.

It should be noted that although tables I, II and III illustrate programs which are useful for illustrative concepts of the present invention, an attempt has not been made to ensure these programs are syntactically correct. Rather, these programs are provided for the exemplary teaching of concepts of the present invention. It is understood from an examination of the programs of tables I and II that the program of Table I may write the variable temp_high without regard to the eventual recipient of the variable and likewise the program of Table II may read the variable fan_on without regard to the writer node of the variable. Thus, these programs work equally well in a network such as illustrated by FIG. 2 including separate control cells 101 and 121 or in a network such as illustrated by FIG. 3(a) which does not include such control cells. The binding Set illustrated by Table III determines the relationship between the various nodes of the network. Table IV illustrates a binding set which may be used to establish connections in a network such as illustrated by FIG. 2.

A node of the present invention

Figure 4:
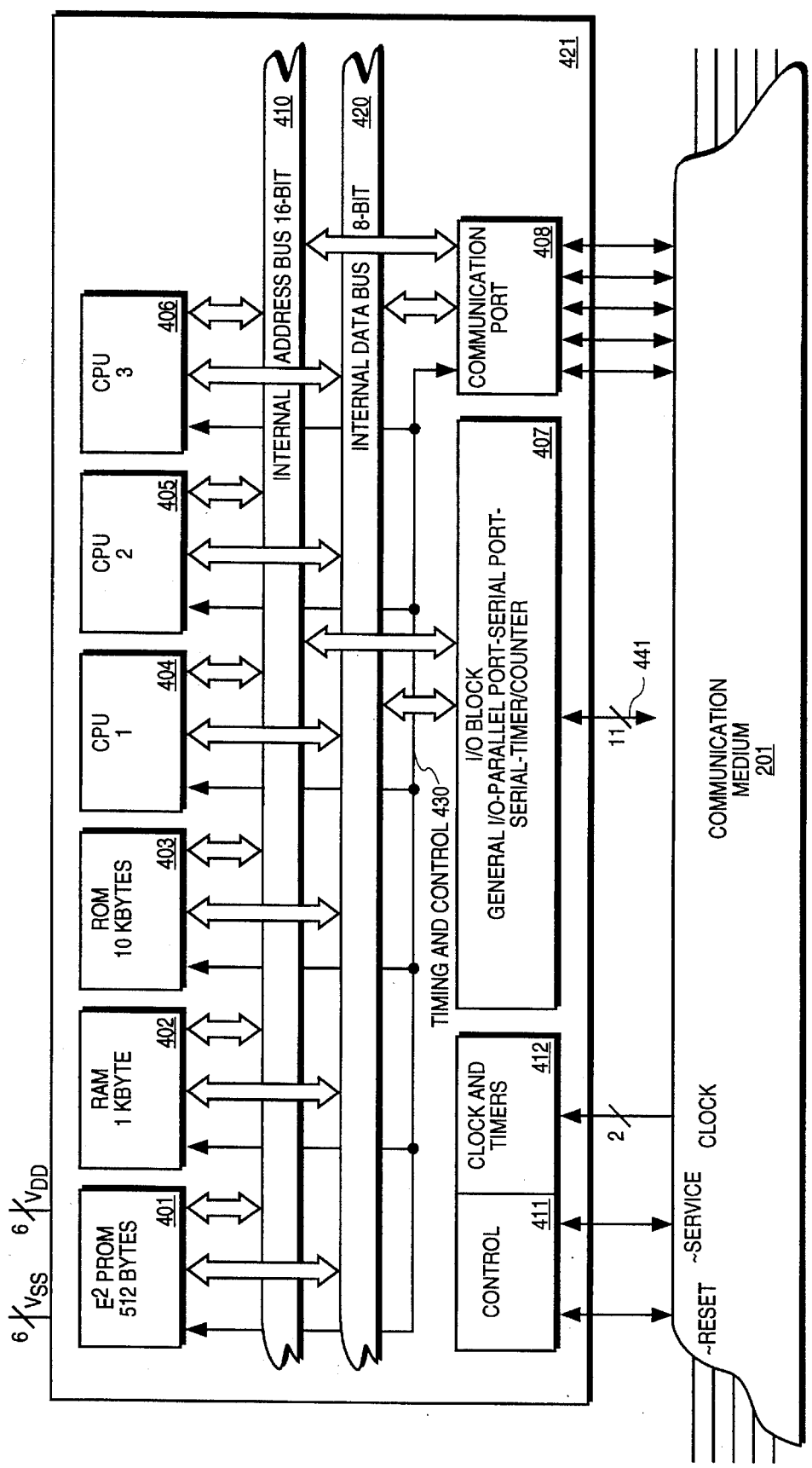
FIG. 4 is an overall block diagram of a single node of the present invention coupled with a communication medium.

FIG. 4 illustrates a block diagram of a node such as nodes 301–305 as may be utilized by the present invention. The node 421 is coupled in communication with medium 201 through control 411, clock and timer circuitry 412, and communication port 408. In addition, the node provides a general purpose I/O port 407 allowing for communication with various external devices. The node further comprises three separate processors 404–406, a read only memory (ROM) 403, a random access memory 402, and an EEPROM 401. The processors 404–406 are useful for executing programs such as the programs illustrated in Tables I and II, as well as other communication, control and operating programs. The ROM 403 may be useful for storing such programs. As will be seen, the EEPROM 401 may be useful for storing certain data values which, although configurable, are not subject to frequent changes in value. Each of the processors 404–406, ROM 403, RAM 402, EEPROM 401, control 411, clock 412, I/O port 407, and communication port 408 are coupled in communication through internal address bus 410, internal data bus 420 and timing and control lines 430.

PROGRAMMING AND CONFIGURING NETWORK OF THE PRESENT INVENTION

Figure 5:
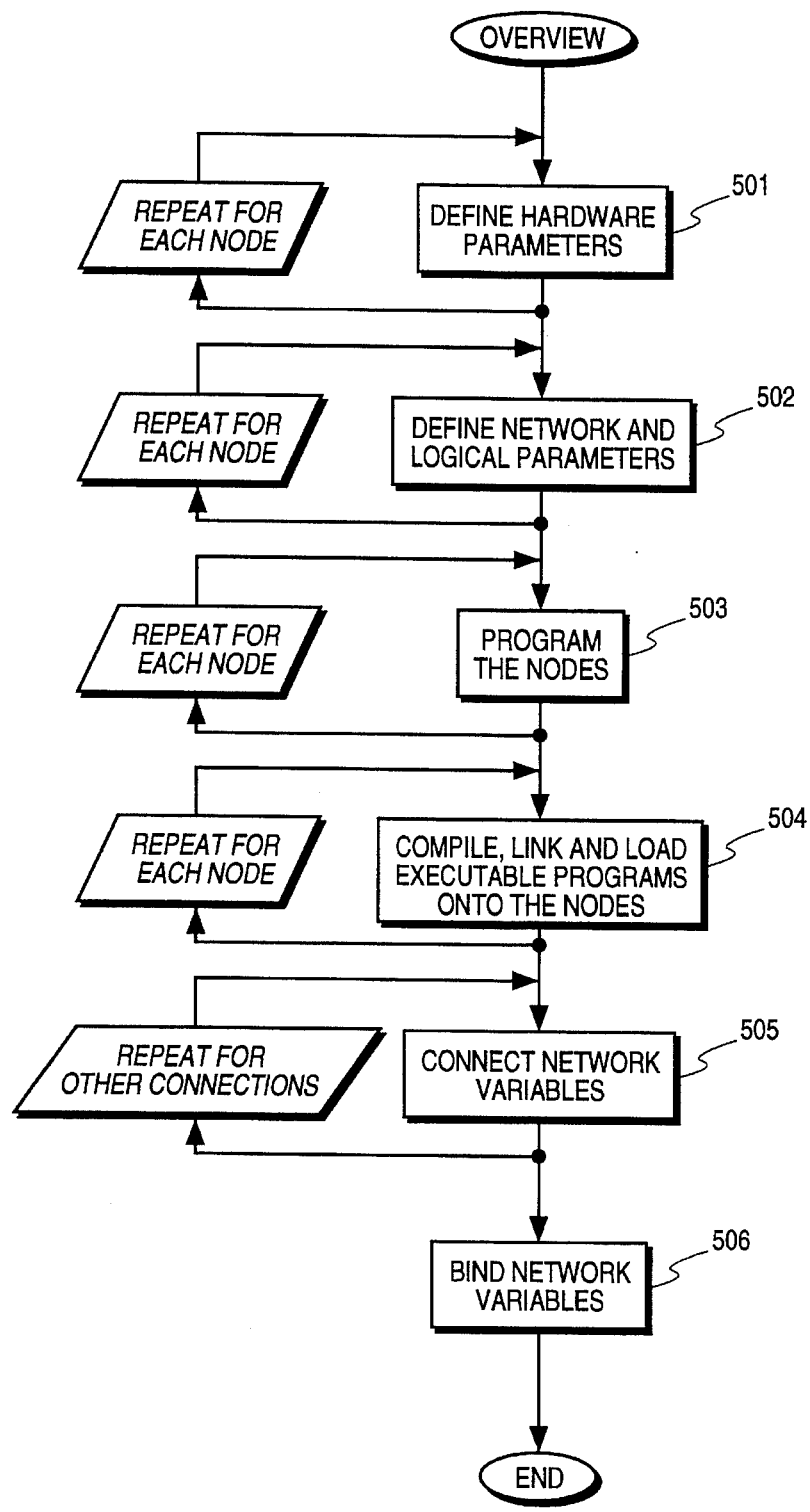
FIG. 5 is an overall flow diagram illustrating a method of programming and configuring a network as may be accomplished by the present invention.
Figure 6:
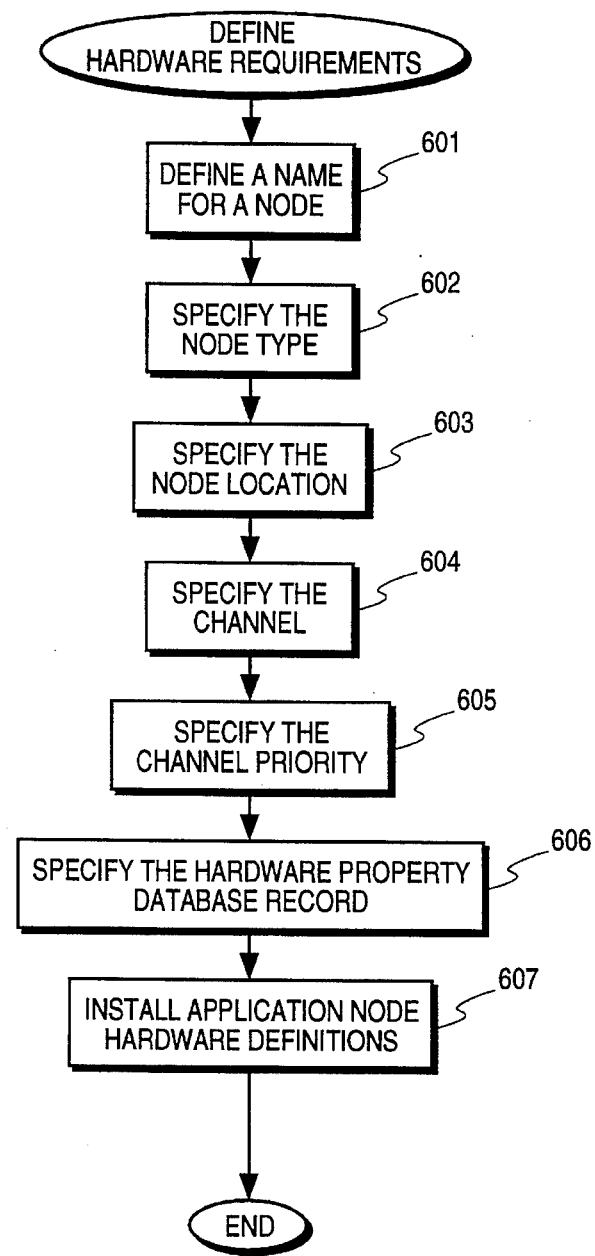
FIG. 6 is a flow diagram illustrating a method for defining hardware requirements of a node as may be utilized by the present invention.
Figure 7:
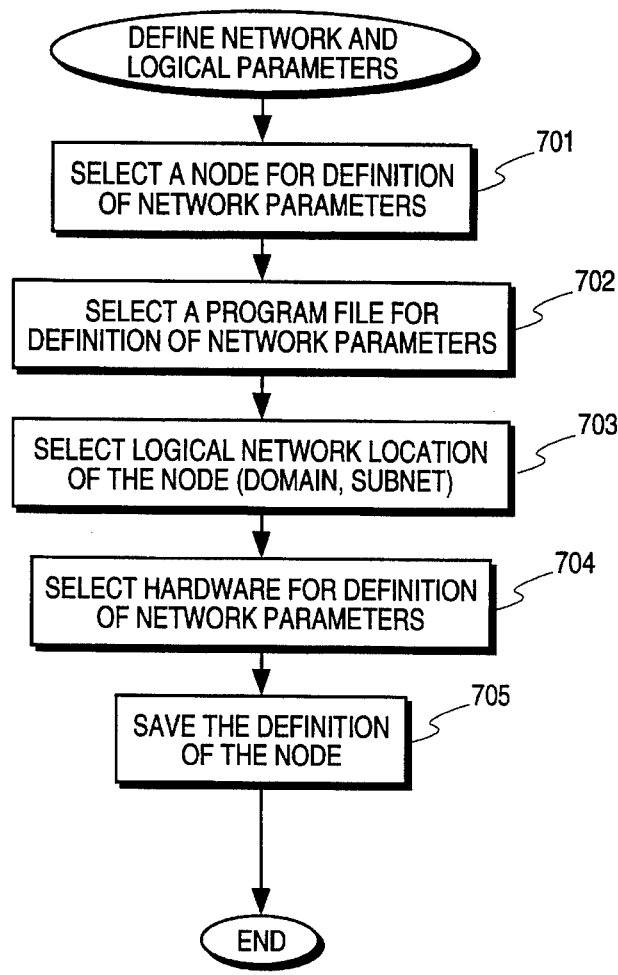
FIG. 7 is a flow diagram illustrating a method for defining network and logical parameters of a node as may be utilized by the present invention.

Turning now to FIG. 5, steps for programming and configuring a network of the present invention are illustrated. It should be noted that steps illustrated by FIG. 5 are implemented in a development system which allows for development and management of networks such as may be implemented by the present invention. However, certain of these steps may also take place outside of the development environment (e.g., connection of network variables and binding). The development system is an integrated hardware and software environment that operates in conjunction with a host computer, an IBM PC/AT compatible in the currently preferred embodiment, allowing a manufacturer or other party to design and build components compatible for communication with a network of the present invention.

The development system includes an IBM PC/AT-compatible computer having an interface adapter card for coupling with a control processor located in a separate card cage. In addition to the control processor, the card cage may hold other cards designed to emulate routing functions in a network and transceiver evaluation boards allowing evaluation of the physical interface with various media, e.g., twisted pair, power line, or radio frequency.

Initially certain hardware parameters are defined for each node in the network, block 501. This step includes naming or otherwise identifying the node, block 601. A node type is specified, block 602. In the development environment, the node type may be specified as the control processor, an emulator board, or a custom node type. The location of the node is then specified—the location specifies whether or not the node resides in a card cage and, if the node resides in a card cage, the card cage number and slot number, block 603. Next, the channel to which the node is connected is specified, block 604, and the channel's priority is specified, block 605. If the node has been assigned the priority privilege, then the node's priority is set at this time. Finally, certain hardware properties may be specified, block 605. Hardware properties may include model numbers for the node, clock rates, operating system revision levels, ROM size, RAM size, EEPROM size, RAM start address, and EEPROM start address. Finally, the hardware definitions are downloaded to the node, block 606.

Next, network and certain logical parameters are specified for each node, block 502. Currently, this step involves specifying a node name, block 701, and then specifying a program file, block 702, and hardware device name, block 703 associated with the node. Hardware names were specified above in step 601. Program files will be discussed in greater detail below in connection with block 503. The definition of the node is then saved, block 704.

The development environment provides an editor for developing and editing program code, block 503, such as the code illustrated in tables I and II. The preferred embodiment allows programming in the "C" language and, further, provides certain extensions to the "C" language which will be discussed in greater detail below. After developing program code, the programs are compiled, linked and loaded as executable programs, block 504, onto the nodes specified in definition of network and logical parameters, block 502.

Connections are then specified for the network, block 505. This step is better illustrated with reference to FIG. 8(a). Initially, a connection name is entered (for example, the connection names specified in the binder script of Table III are temp1_controls, temp2_controls and temp3_controls), block 801. In the preferred embodiment, the connection name is entered as a unique name having from one to 16 characters consisting of letters, numbers and underscores; no spaces are allowed.

Next, a node name is selected, block 802. In the preferred embodiment, a list of defined nodes (i.e., nodes which have been previously defined as described in connection with block 502) is displayed and a valid node name may be selected from the displayed list. For example, the node temp_sensor_1 may be selected. After selecting a node name, block 802, a network variable name is selected, block 803. Again, a list of network variable names for the selected node are preferably displayed and a network variable name is selected from the displayed list. For example, the network variable temp_high may be selected.

After completing this process for a first node, a second node may be selected, block 804. Again, a node list is preferably displayed and the second node is selected from the displayed node list. For example, the node fan_1 may be selected. A network variable associated with the second node is then selected, block 805, again preferably from a displayed list. Continuing the example, the selected network variable may be fan_on.

Finally, certain parameters may be set, block 806. In the preferred embodiment, settable parameters include the retry count set to the maximum number of times the message will be sent, the retry timer for acknowledged services, and the repeat timer for unacknowledged/repeated messages. This aspect of the present invention will be discussed in greater detail below.

The connection is then added to a connection list using an add function, block 807. It is noted that if additional nodes are to be connected in the connection, they are specified in a similar manner to the first and second nodes after having specified the first and second nodes. An example of such a connection is illustrated in Table III as temp2_controls which includes three nodes: temp_sensor_2, fan_1 and fan_2.

Figure 8A:
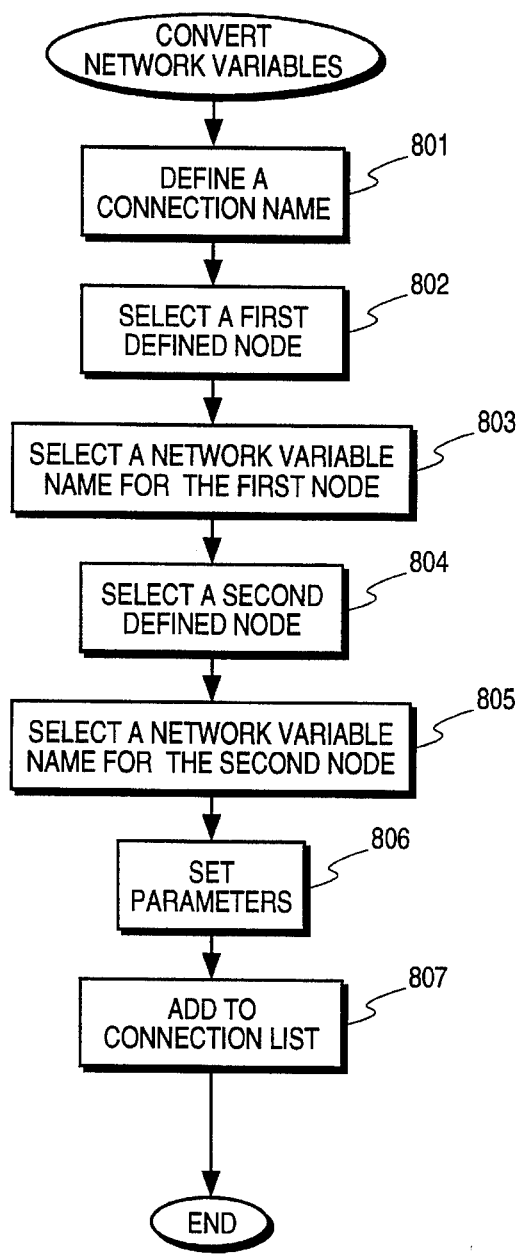
FIG. 8(a) is a flow diagram illustrating a method for defining connections among network variables as may be utilized by the present invention.

The process of FIG. 8(a) is repeated for each desired connection. In the case of the binding set of Table III, the process is repeated three times: (1) once for the connection named temp1_controls; (2) once for the connection named temp2_controls; and (3)once for the connection named temp3_controls. In the case of the binding set of Table IV, the process is repeated five times, once for each of connection_1, connection_2, connection_3, connection_4, and connection_5.

In the preferred embodiment, the output of the connection process is a binary script file that provides commands to drive the subsequent binding process. In order to provide a textual version of what this binary file looks like, Table III and Table IV have been provided.

It is also within the power of one of ordinary skill in the art to develop a graphical user interface for drawing the connections between iconic representations of the nodes and creating a binder script based on such drawings.

Figure 8B:
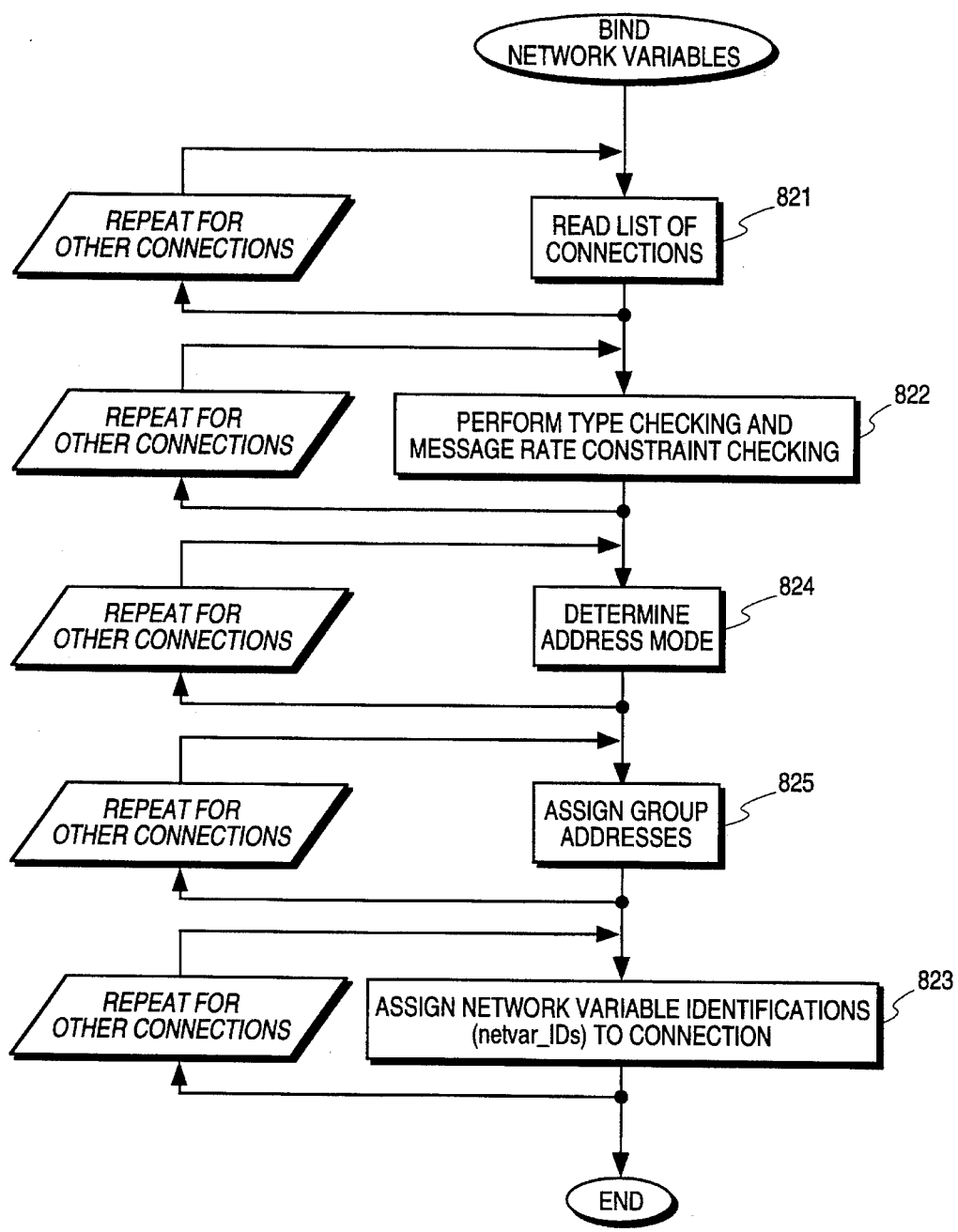
FIG. 8(b) is a flow diagram illustrating a method for binding network variables as may be utilized by the present invention.

Finally, the network variables are bound, block 506, to their respective nodes in order to allow communication within the connections defined during execution of the steps of FIG. 8(*a*). The preferred method of binding network variables is described in greater detail with reference to FIG. 8(*b*).

Initially, the list of connections developed during execution of the steps of FIG. 8(*a*) is read, block 821. Then, certain type checking and message constraint checking is performed for each connection, block 822. The type and message constraint checking includes the following checks:

(1) Ensure that there are at least two members in each connection;

(2) Ensure that there is at least one output member and one input member for each connection;

(3) In the preferred embodiment, no more than one input and one output network variable from the same node may appear in the same connection;

(4) A warning is given if polled output variables are not attached to at least one polled input;

(5) An estimate for message rates may be declared for network variables; a warning is given if the estimated message rates do not match for all members of a connection;

(6) Network variables may be synchronized or non-synchronized—a warning message is provided if synchronized variables are bound to non-synchronized variables;

(7) Network variables may be sent as authenticated—a warning is provided if some, but not all, members of a connection are declared as authenticated; and (8) Variable types are checked field-by-field for size and sign type matching and for type definition matching. The currently preferred list of type definitions are provided in Table V.

After completing type and message rate constraint checking, the addressing mode for the network variable is determined, block 824. If there is only one destination (e.g., temp1_controls), subnet-node addressing is used using the subnet-node structure given below to create an entry in address table 901. Address table 901 will be discussed in greater detail below. The address entered in the address table 901 is the address of the destination node (e.g., in the case of temp1_controls, the address of fan_1 is entered in the address table of temp_sensor_1; conversely, the address of temp_sensor_1 is entered in the address table of fan_1 to allow for such functions as polling of the current status of the network variable). The address table index entry 912 is set to correspond to the location in the address table 901 corresponding with the address entered in the address table 901. For example, in the case of the bind set of Table III, if the address of FAN_1 is entered as a network address 913 in the address table 901 at entry 001, the address table index entry 912 of the network variable table 903 corresponding to the network variable id assigned to the connection temp1_controls is written with the address 001. In this way, whenever messages are sent on the network by temp_sensor_1 indicating the value of temp_high has been updated, the address table index is used to lookup the address of the destination node of such a message. A message is then sent, addressed to the destination node, including the network variable id and the new value. The destination node then receives the message and is able to update the value of its corresponding network variable "fan_on ".

If there is more than one destination node (e.g., temp2_controls), group addressing is used using the above group address structure to create an entry in the address table 901. In the case of group addressing, a set of sender and destinations for the network variable is constructed. For example, in the case of the connection temp2_controls, the set of sender and destinations includes temp_sensor_2, fan_1 and fan_2.

Other optimization steps are also provided by the binder of the preferred embodiment and are described in further detail below.

After determining an addressing mode, for each unique set of sender and destinations (unique without respect to which nodes are senders and which nodes are receivers), a group address is assigned to the set, block 825. The group address is propagated to the address table of each of the nodes in the set and stored in their respective address tables 901. The address table index value 912 for the entry corresponding to the group address is updated to index the address table 901 at the new entry. For example, group 1 is defined to include temp_sensor_2, fan_1 and fan_2 and the group address is stored at entry 002 of the address table 901. Then, the address table index 912 for each of the three nodes temp_sensor_2, fan_1 and fan_2 is updated to point to the new address table entry.

For group address table entries, as described above, only the output network variable nodes actually set their network variable table entries to index the address table. The nodes with input network variables will not index the address table. This allows the same network variable to reside in several network variable connections, and many network variable groups. When an incoming message arrives for one of these input network variables, the correct network variable table entry is found using the network variable ID (the software matches the network variable ID in the message to one in the table).

This "intersecting connection" ability makes the network variable concept more powerful by allowing the same variable to be updated by several groups, thus reducing both the overall network traffic and reducing network variable table space by sharing the same table entry among several connections.

Finally, a single network variable identification number (netvar_ID) is assigned to each network variable in the connection, block 823. This may be better understood with reference to FIG. 9 which illustrates a network variable table 902 having a network variable identification field 911 and an address table index field 912. Further, an address table 901 is illustrated having a network address field 913. It should be noted that these tables preferably reside in each individual node's EEPROM 401 and have additional fields in the preferred embodiment. However, for simplicity only the above-mentioned fields are illustrated in FIG. 9. The network variable table is preferably of a structure as follows:

```
struct nv_table
{       unsigned priority:1;    /*1=priority network variable, 0=non-priority nv*/
        unsigned dir:1;         /*direction 0=input, 1=output*/
        unsigned idhi:6;        /*network variable id, most significant bits*/
        unsigned idlo;          /*network variable id, least significant bits*/
```

```
    unsigned ta:1;         /*turnaround: 1=turnaround*/
    unsigned st:2:         /*service*/
    unsigned auth:1;       /*authenticated: 1=authenticated*/
    unsigned addr:4        /*address table index*/
};
``` where the priority field indicates whether messages to update the network variable are to be sent as priority or non-priority messages; direction indicates the direction of the target ID, for example, a network variable update going from an output variable to an input variable would have the direction bit set to a 0; the network variable id is a 14 bit identification number allowing for a maximum of 16,384 unique network variables per domain in the network and corresponds to the network variable id 911 of FIG. 9; turnaround indicates an output network variable may be connected to an input network variable of the same node; service indicates whether acknowledged or unacknowledged services is utilized; auth indicates whether message are authenticated prior to being accepted and processed by identifying the sender node through an authentication process; priority indicates whether messages are transmitted as priority or normal messages; and the address table index corresponds to address table index 912 and is an index into the address table 901.

The Address Table preferably follows one of two formats given below; the first format is for group address table entries and the second format is for single destination node address table entries:

variable id $00000000000001_2$ may be assigned to the connection temp2_controls of Table III; and the network variable id $00000000000010_2$ may be assigned to the connection temp3_controls of Table III. It should be noted that network variable ids need not be unique domain wide, but only need be unambiguous within the nodes involved.

Certain advantages gained through use of network variables have now been described such as the ability to automatically generate network addressing schemes from application level connections. In addition to allowing for such ease of use, network variables lead to generally smaller and less complicated application programs over other forms of network communication, such as prior art messaging techniques. Tables V and VI better illustrate differences between and certain advantages of use of the present invention's techniques over, for example, prior messaging techniques. Table V is a program written using network variables of the present invention. Table VI is a functionally equivalent program written using prior art messaging techniques. It is useful to note the comparative program statistics at the end of each program listing in which it is shown that the message program requires 626 bytes of ROM; 177 bytes of EEPROM; and 1314 bytes of RAM. By way of comparison,

```
struct group
{       unsigned type:1;       /*indicates whether the structure is for a group or
                                single node*/
        unsigned size:7;       /*group size (0 for groups > 128 members*/
        unsigned domain:1;     /*domain reference*/
        unsigned member:7;     /*node's member # (0 for groups > 128 members*/
        unsigned rpttimer:4;   /*unacknowledged message service repeat timer*/
        unsigned retry:4;      /*retry count*/
        unsigned rcvtimer:4;   /*receive timer index*/
        unsigned tx_timer:4;   /*transmit timer index */
        int group;             /*group id*/
}
struct subnetnode
{       unsigned type;         /*indicates whether the structure is for a group or
                                single node*/
        unsigned domain:1;     /*domain reference*/
        unsigned node:7;       /*node's #*/
        unsigned rpttimer:4,   /*unacknowledged message service repeat timer*/
        unsigned retry:4;      /*retry count*/
        unsigned rsvd:4;       /*reserved*/
        unsigned tx_timer:4;   /*transmit timer index */
        int subnet;            /*subnet*/
}
```

It should be noted here that many of the present invention's concepts of groups, domains, subnets, acknowledged messages, etc. are described in greater detail with reference to U.S. patent application Ser. No. 07/621,737 filed Dec. 3, 1990 titled Network Communication Protocol (the '737 application) which is assigned to the assignee of the present invention and which is incorporated herein by reference.

Continuing with the description of assigning a network variable id to a connection, block 823, the first unassigned network id is assigned to the connection and the network variable id is written to the network variable table 902 for each node using the network. Thus, in the above example, the network variable id $00000000000000_2$ may be assigned to the connection temp1_controls of Table III; the network the network variables program requires only 335 bytes of ROM while using 231 bytes of EEPROM and only 1126 bytes of RAM.

SELF-IDENTIFYING STANDARD NETWORK VARIABLE TYPES

Figure 10:
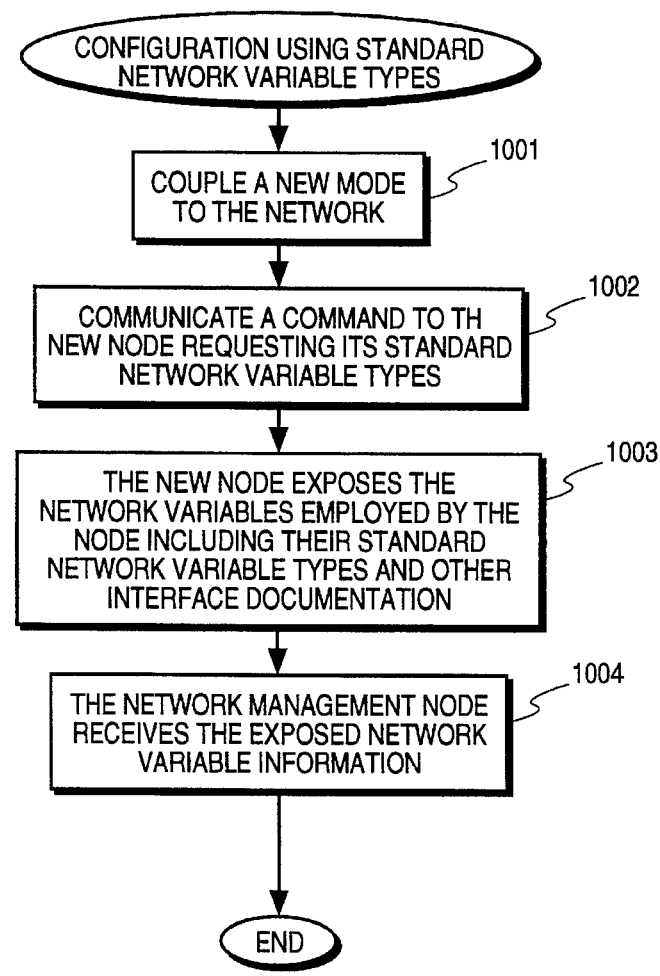
FIG. 10 is a flow diagram illustrating a method of configuring a network using standard network variable types, as may be utilized by the present invention.

It is desirable to provide for interoperability between nodes in a network. To provide for such interoperability, it is necessary to assure compatibility between network variables in the various nodes of a network. To facilitate such compatibility, as one feature of the present invention, a list of standard network variable types is provided by the assignee of the present invention. The currently preferred list of standard network variable types is provided as Table VII. By utilizing the list of standard network variable types, nodes in the network may be interrogated for information on the network variables employed by the node and the network may then be configured based on this information. This process is better illustrated with reference to FIG. 10.

Initially, a node which must be configured is coupled to the network medium, block 1001. After the node is coupled to the medium, an address of the node may be determined through any number of methods. At least one of such methods is described with reference to the '737 application. After having determined an address for the node, messages may be communicated to the node over the medium. In the preferred embodiment, a network management node is coupled to the medium which is useful for configuring the network. The network management node may communicate a command to the new node requesting its information on the network variables employed by the node, block 1002, or may alternatively read such information from a file which has already been placed in the network management node's memory.

In the preferred embodiment, in order to allow for the information to be stored in the network management node's memory, such information is made available for importation into the network management node via a binder interface file (BIF). The BIF file is a byproduct of the compilation process for each node, and contains all the information necessary to install the node on the network. This information is also referred to as the exposed interface of the node.

The BIF file for a new node may by provided to the network management node prior to installation of the new node on the network in order to allow a complete network database to be constructed in advance of, and separate from, the physical installation of the new node on the network. For example, the BIF file may be supplied to the network management node on diskette, over phone lines, or on through other computer readable media.

Information equivalent to the information stored in the BIF file is also preferably stored in the memory of the node. In this case the preferred embodiment confines the application writer to use of a list of standard network variable types when developing an application program designed to run on the node. The list of standard network variable types used by the system of the preferred embodiment is enumerated in Table VII. Use of the list of standard network variables minimizes the required space for storing the exposed interface in the node's memory. Storing the exposed interface in the node's memory offers the advantage of allowing the information to be retrieved without need for the network management node to include a floppy disk drive or other device for receiving externally communicated computer readable information. However, absent the option of providing the BIF file over such an external interface, the node must be physically connected on the same network with the network management node prior to construction of the network database. In the preferred embodiment, both options are available and the choice of how the exported interface is imported into the network management node is left up to the node designer.

The file layout for the BIF file of the preferred embodiment is given in Table IX. An example of a BIF file is given in Table X. This exemplary BIF file has been generated for the program given in Table V.

As was mentioned, in the preferred embodiment nodes may utilize the standard network variable types in declaration of network variables. The information describing its network variables is communicated (or exposed) by the node to the network management node, block 1003, using standard messaging features of the network. It will be understood that in alterative embodiments, information describing other, non-standard variable types may also be communicated in a manner similar to communicating the information on standard network variables.

The network management node receives the exposed network variable information, block 1004, and may then use information, including the network variable type, in verifying valid connections and in the binding process. Only network variables of identical types may be bound together in a single connection-thus, use of standard network variable types facilitates interoperability of nodes in the network as well as facilitating identification of network variables when a command is issued to expose the network variables of a node.

As one extension to the concept of self-identifying standard network types as just described, it is possible to include in the information transmitted responsive to receiving the command to expose network variable's text strings and even graphical icons to the network management node. Such information would make the nodes largely self-documenting.

EXTENSIONS TO THE "C" LANGUAGE

The present invention has implemented certain extensions and features to the "C" programming languages to support use of network variables-these extensions include (1) the already disclosed declarations of variables as network variables and the ability to declare such variables as standard network variable types; (2) declaration and use of I/O objects; and (3) scheduling clauses. Each of these extensions will be discussed in greater detail below. It should be noted that although the extensions have been preferably implemented in the "C" programming language, the idea and concepts of these extensions are not limited to use in this programming language and, in fact, these ideas and concepts may readily be extended to other programming languages.

Network variable declarations

Figure 11:
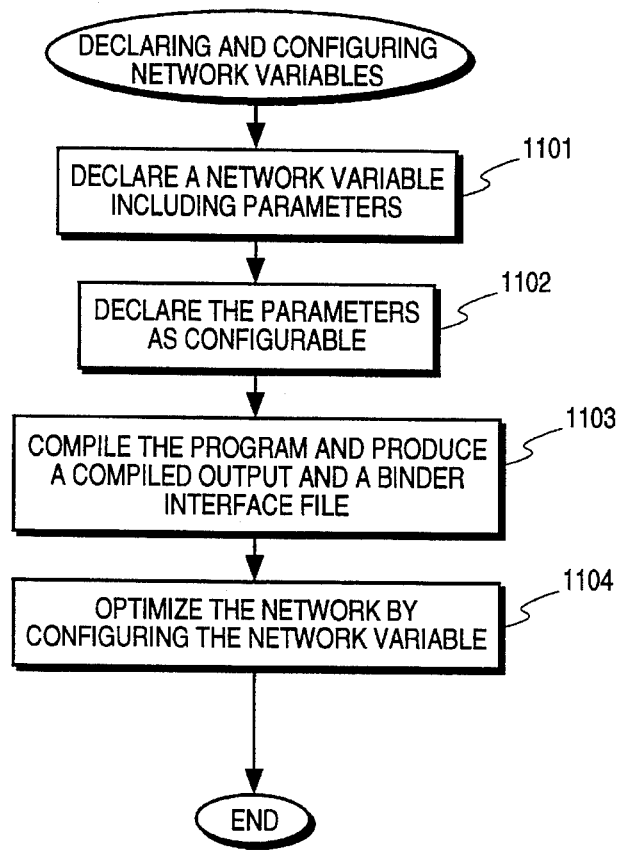
FIG. 11 is a flow diagram illustrating a method of declaring and configuring a network variable as may be used by the present invention.

As has been discussed, the present invention provides for declaration of network variables in C programs. Importantly, the declaration of network variables allows for declaring certain information for use by the above-described binding process. This process is better understood with reference to FIG. 11. Initially, a network variable is declared in a computer program intended to run on a node of the network of the present invention, block 1101. The preferred format for the declaration may be found with reference to Table VIII, below. As can be seen with reference to Table VIII, the declaration format preferably includes a set of parameters called bind_info. These parameters allow the network variable to be declared with an initial specification of protocol services. When the program is compiled, this initial information is output as pan of the BIF file. The format of the BIF file may be found with reference to Table IX. As one option in declaring network variables, these parameters may be declared as configurable or non-configurable, block 1102. In this way, a programmer programming a node may make an initial determination as to the state the parameter should normally be set to. For example, the programmer may determine in a typical configuration, a particular network variable should use acknowledged message services. However, the programmer may also allow a network administrator flexibility in configuring and optimizing the network by declaring the acknowledged parameter as configurable. The program is then compiled and a compiled output is produced in the conventional manner. In addition to producing the conventional outputs of a compiler, e.g., object code, the compiler of the present invention produces the above-mentioned BIF file which includes information on the declared network variables such as the state of parameters and whether or not such parameters are configurable, block 1103.

During configuration of the network of the present invention, the state of these configurable parameters may be modified by the network administrator, block 1104. In the above-discussed example, the network administrator may determine the network will be optimally configured if the variable declared as acknowledged is actually configured as unacknowledged and repeated. It is worthwhile to again refer to FIG. 8(*a*) which illustrates, in addition to other steps in the connection process, the step of setting parameters for the connection, block 806. The parameters which are settable in this step of the configuration process are those parameters declared as configurable in the network variable declarations. These parameters are displayed on a display screen during the configuration process and may be modified by changing the state of the parameters on the display screen. For example, one of three states may be set to tell the network the type of service to be used for a network variable-unacknowledged, unacknowledged and repeated, and acknowledged. The authentication feature may be set to an on state in which message authentication is used or to an off state in which message authentication is not used. Also, network variable may be set to a priority state or a non-priority state indicating whether messages associated with the variable are to be sent as priority messages or as normal messages.

Declaration and use of Objects

Each node of the present invention comprises its own scheduler, timers, and logical I/O devices. The "C" programming language employed by the present invention provides access to these devices through use of predefined objects; namely, an event scheduler which handles task scheduling for the node, timer objects which provide both millisecond and second timers, and I/O objects which provide for declaration of a number of logical I/O devices. Importantly, once declared a logical link is created between the object name and the physical device and references may be made to the object name to gain access to the physical device.

Declaration and use of objects will be discussed in greater detail by referring to declaration of I/O objects. Each node of the network of the present invention has a number of built-in electrical interface options for performing input and output. Prior to performing input or output, a program must declare an 140 object which interfaces with one of eleven 140 pins on the node; three serial pins 441 and eight parallel pins 445. The eleven pins are referred to with the reserved pin names: IO__0, IO__1, 10__2, IO__3, IO__4, IO__5, IO__6, IO__7, 10__8, IO__9, and IO__10. The declaration syntax for an 140 object and use of the eleven pins in the present invention is discussed further with reference to Table XI.

Figure 12:
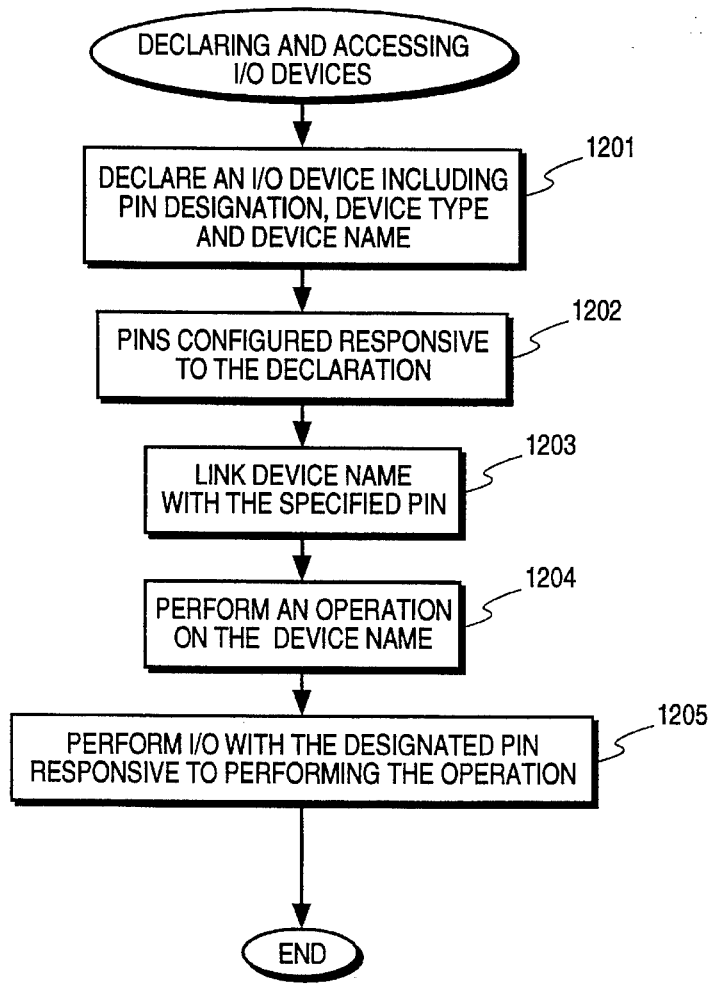
FIG. 12 is a flow diagram illustrating a method of declaring and accessing I/O devices as may be utilized by the present invention.

It is worthwhile to turn to FIG. 12 to discuss this concept in somewhat greater detail. Initially, a program statement is coded to declare an 140 device giving a pin designation, a device type and a device name; when the program is compiled the declaration statement causes declaration of the 140 device, block 1201. Other parameters and the format of the declaration for an 140 device in the preferred embodiment may be found with reference to Table XI. Responsive to declaring the 140 device, the pins are configured to perform the function specified by the device type, block 1202. The device types of the preferred embodiment may be found with reference to Table XI.

This process is further illustrated with reference to the exemplary network variable program of Table V and the associated assembly language code resulting from a compile of the program given in Table XIV. As can be seen with reference to the program source code in Table V, two 140 devices are declared, IO__0 as a bit output named MotorCtrl and IO__5 as a pulsecount input named pulseamps.

The specified device name is logically associated with the specified device to perform the designated 140, block 1204. In this way, a reference may be simply made to the device name to accomplish the designated I/O with necessity of continued reference to specific pins and without need for special coding to implement the desired device types. As can be seen with reference to Table XII, built-in functions are provided to allow communication with the I/O devices. One of the built-in functions may be used to perform the built-in function referring to the desired device name to specify a hardware device, block 1204. The desired I/O is then performed in accordance with the device type specified in the device declaration, block 1205.

Scheduling

Scheduling on a node in the present invention is event driven. When a given condition becomes true, a body of code termed a task associated with that condition is executed. In the preferred embodiment, scheduling is accomplished through "when" statements. The syntax of a when statement of the preferred embodiment is given in Table XIII. An example of a when statement is given below:

```
when (timer__expires (led__timer))         /* This line is the when clause    */
{
        io__out (led, OFF);                /* This is the task - turn the led off */
}
```

In the above example, when the application timer led__timer expires, the body of code following the when statement is executed (and the LED is turned off). When statements provide for execution of a task (the bracketed code) when the condition specified (e.g., the led__timer expires) evaluates to true. It is known in the art to provide structures in programming languages which allow for conditional execution of a task when a statement evaluates to true. However, in known systems which include a scheduling statement (a when statement or the equivalent), the event which is evaluated is a predefined event, As is noted in Table XIII, the present invention provides for use of predetermined events in scheduling statements. However, as one important aspect of the present invention, events may also be any valid C expression. For example, the following statement may be coded in a system of the present invention:

```
when (x == 3)            /* This line is the when clause   */
{
    io_out (led, OFF);   /* This is the task - turn the led off */
}
```

In this case, whenever the event x==3 occurs, the LED is turned off. Of course, significantly more complicated C programming statements may be envisioned to define an event. As will be understood by one of ordinary skill in the art, allowing evaluation of any valid language expression to define an event offers significant flexibility over known systems. The present invention further allows for use of multiple when statements to be associated with a single task. For example:

```
when (powerup)                  /* This line is one when clause     */
when (reset)                    /* This line is another when clause */
when (io_changes(io_switch))    /* This line is another when clause */
when (x = 3)                    /* This line is another when clause */
{
    io_out (led, OFF);          /* This is the task - turn the led off */
}
```

In this case, when any of the above events evaluates to true, the task is executed—e.g., the LED is turned off.

Importantly, as one aspect of the present invention, I/O objects may be referred to in an event clause allowing improved ease of programming of the system of the present invention. For example, two methods may be used to determine if an input value is new: (1) the io_update_ occurs event may be used, referring to the desired device in a when statement or the io_in function may be used. The below two programs accomplish the same goal.

```
                       PROGRAM 1
IO_5 input pulsecount dev;
when (io_update_occurs (dev))
    {
        /* perform the desired function */
    }
```

```
                       PROGRAM 2
stimer t;
IO_5 input pulsecount dev;
when (timer_expires(t))
    { io_in (dev);
        if (input_is_new)
        {
            /* perform the desired function */
        }
    }
```

The particular method chosen will depend on the individual case; however, the above is exemplary of the flexibility and ease of use of the system of the present invention.

Further, as an additional feature of the present invention and as is described with reference to Table VIII, the present invention provides for two levels of when clauses, priority when clauses and normal when clauses. Using this feature, it is possible to handle events which must be dealt with on a priority basis.

PERFORMANCE OPTIMIZATIONS PERFORMED BY THE BINDER OF THE PREFERRED EMBODIMENT

As was discussed above, when more than two nodes are used in a connection, the nodes may be recognized as a group and a group address may be assigned to the group of nodes.

The preferred embodiment also carries out other performance optimization routines to achieve minimal network traffic with resulting optimized response time. For example, the binder determines optimal protocol service class and addressing allocation at the time of binding variables in order. Illustrative of this, with reference to FIG. 3(b), three separate connections are shown, 321–323. Although this represents a typical optimal configuration, these three connections could be combined by the binder into a single group resulting in nodes sometimes receiving messages about network variable updates which are not used by those nodes. In such a configuration, although there are additional messages received by the nodes, no effect is seen by the application running on the node because the network variable messages include a 14-bit network variable identification. Therefore, nodes which have no need for a variable sent to them simply discard and, in the case of acknowledged service, acknowledge the message.

An advantage of grouping many nodes in a single group in the system of the preferred embodiment is that such grouping simplifies tasks for the binder process and further uses only one group address (the preferred embodiment is limited to 255 group addresses per domain).

Further, the binder of the present invention dynamically selects an optimal protocol class of service at the time of binding. This is done by first computing the number of messages it would take to complete a transaction on the first using acknowledged service (including the original message and the acknowledgements). (Note that this number is the group size which is known by the network variable binder process at the beginning of the connection process). Second, this number is compared with the repeat count for repeating message. If the repeat count is less than the group size, and none of the programs require acknowledged services (each program allows the config option for its network variables), then the binder dynamically converts the service from acknowledged to unacknowledged repeat. This reduces network traffic, thus improving response time.

Thus, an improved communication network having capability for communication of information between nodes in the network is described.

What is claimed is:

1. A method for declaring a variable in a program and for configuring said variable for use in a network, said network having a plurality of nodes, said method comprising the steps of:

A) declaring said variable in said program, including the steps of,

A1) declaring a state of a parameter of said variable, said parameter corresponding to methods for communicating values associated with said variable said state indicating a first method for communicating values associated with said variable:

A2) declaring said parameter as being configurable or nonconfigurable;

B) after declaring said variable in said program, compiling said program on a computer system to produce compiled information, said completer system including a processor and a memory, said memory being coupled to said processor, said compiled information including parameter data that indicates said state of said parameter and whether said parameter is configurable or nonconfigurable;

C) after said compiling said program,

C1) accessing said parameter data to determine whether said parameter is configurable, C2) if said parameter is configurable, then a) changing the state of said parameter to an altered state that indicates a second method for communicating values associated with said variable; and b) communicating values associated with said variable between a group of nodes from said plurality of nodes using said second method; and C3) if said parameter is not configurable, then communicating values associated with said variable between a group of nodes from said plurality of nodes using said first method.

2. The method of claim 1 wherein;

said step of declaring a state of a parameter of said variable includes declaring a state indicating a first service class selected from acknowledged communication, unacknowledged communication, and unacknowledged repeat communication;

said step of communicating values associated with said variable between said group of nodes using said first method comprises communicating said values according to said first service class:

said step of changing the state of said parameter to an altered state comprises changing the state of said parameter to an altered state which indicates a second service class selected from acknowledged communication, unacknowledged communication, and unacknowledged repeat communication; and said step of communicating values associated with said variable between a group of nodes using said second method comprises communicating said values according to said second service class.

3. The method of claim 1 wherein: said step of declaring a state of a parameter of said variable includes declaring a state indicating a first authentication designation selected from authenticated communication and unauthenticated communication;

said step of communicating values associated with said variable between said group of nodes using said first method comprises communicating said values according to said first authentication designation:

said step of changing the state of said parameter to an altered state comprises changing the state of said parameter to an altered state which indicates a second authentication designation selected from authenticated communication and unauthenticated communication: and said step of communicating values associated with said variable between a group of nodes using said second method comprises communicating said values according to said second authentication designation.

4. The method of claim 1 wherein;

said step of declaring a state of a parameter of said variable includes declaring a state indicating a first priority designation selected from priority communication and nonpriority communication;

said step of communicating values associated with said variable between said group of nodes using said first method comprises communicating said values according to said first priority designation;

said step of changing the state of said parameter to an altered state comprises changing the state of said parameter to an altered state which indicates a second priority designation on selected from priority communication and nonpriority communication: and said step of communicating values associated with said variable between a group of nodes using said second method comprises communicating said values according to said second priority designation.

5. A method for declaring a variable in a program and for configuring said variable for use in a network, said network having a plurality of nodes, said method comprising the steps of;

declaring said variable in said program including the steps of declaring a state of a parameter of said variable, said parameter corresponding to service classes, said state indicating an acknowledged service;

declaring said parameter as being configurable or nonconfigurable;

after said declaring said variable in said program compiling said program on a computer system to produce compiled information, said computer system including a processor and a memory, said memory being coupled to said processor said compiled information including parameter data which indicates said state of said parameter and whether said parameter is configurable or nonconfigurable;

after compiling said program accessing said parameter data to determine whether said parameter is configurable, if said parameter is configurable then determining a group of nodes, from said plurality of nodes, that will communicate information corresponding to said variable;

determining a number of messages required to complete a transaction among said group of nodes using said variable and an acknowledged service;

comparing said number of messages with a repeat count for a message including said variable;

determining if said repeat count is less than a number of nodes in said group;

if said repeat count is less than said number of nodes in said group then altering the state of said parameter, said stare being altered from acknowledged to unacknowledged repeat; and communicating information corresponding to said variable using an unacknowledged repeat service;

if said repeat count is not less than said number of nodes in said group then communicating information corresponding to said variable using said acknowledged service.

6. The method of claim 5 wherein each node in said group of nodes includes a node program, and each node program includes network variable information corresponding to said variable, and wherein said network variable information corresponds to a configurable service class, and wherein said step of determining if said repeat count is less than said number of nodes in said group further includes a step of determining that each node program includes information corresponding to said variable and that said information corresponds to a configurable service class.

7. A method for specifying how a node in a network communicates values associated with a variable to other nodes in said network, said method comprising the computer-implemented steps of:

storing source data on a computer-readable medium said source data including a first variable information corresponding to said variable, said first variable information including parameter information for at least one parameter associated with said variable, said parameter information including for each parameter of said at least one parameter
a parameter value; and
a configuration indicator, said configuration indicator indicating whether said parameter is configurable;
said parameter value of said at least one parameter indicating a first method of communicating said values associated with said variable;

reading said source data from said computer-readable medium and compiling said source data to generate a complied data said compiled data including a second variable information, said second variable information including data which indicates the parameter value and the configuration indicator for each of said at least one parameter;

generating based on said compiled data, connection information which indicates a method for communicating said values associated with said variable, said step of generating connection information including
inspecting said second variable information to determine whether said at least one parameter is configurable,
if said at least one parameter is configurable, then generating connection information that indicates a second method for communicating said values associated with said variable:
if said at least one parameter is not configurable then generating connection information that indicates said first method for communicating said values associated with said variable:

communicating said connection information to said node;

said node storing nozzle variable information corresponding to said connection information:

said node communicating values associated with said variable to other nodes in said network using said method of communicating said variable information that is indicated in said connection information.

8. The method of claim 7 wherein said source data includes a program defining said first variable information and said parameter information.

9. The method of claim 7 wherein said at least one parameter includes a first parameter that defines a service class, said parameter value for said first parameter indicating one of acknowledged communication, unacknowledged communication, and unacknowledged repeat communication.

10. The method of claim 9 wherein said at least one parameter includes a second parameter that defines an authentication designation, said parameter value for said second parameter indicating one of authenticated communication and unauthenticated communication.

11. The method of claim 10 wherein said at least one parameter includes a third parameter that defines a priority designation, said parameter value for said third parameter indicating one of priority communication or nonpriority communication.

12. The method of claim 7 wherein said steps of storing source data, compiling said source data generating connection information and communicating said connection information are performed by a single computer, 13. The method of claim 7 wherein said connection information includes node information for said node and a second node, said second node being coupled to said network, said node information includes a network variable identifier corresponding to said variable and a corresponding second variable for said second node, the method further comprising the step of communicating said connection information to said second node.

14. The method of claim 13 wherein prior to communicating said connection information, the following steps are performed:
performing message rate constraint checking for said connection information;
assigning a group address for said connection information; and
determining said network variable identifier.

15. The method of claim 14 wherein said step of performing message rate constraint checking includes the steps of:
accessing a first estimated message rate corresponding to said variable;
accessing a second estimated message rate corresponding to said second variable; and
generating a warning if said first estimated message rate does not match said second estimated message rate.

16. The method of claim 7 wherein said compiled data includes a binder interface file and a compiled program.

17. A method of enabling two nodes in a network to sham information relating to a network variable, said network including a first node coupled in communications with a second node, said method comprising:
defining a first variable in a first program, said first variable having a configurable first service class value;
defining a second variable in a second program, said second variable having a configurable second service class value;
a first computer generating connection information by accessing information corresponding to said first program and said second program, said connection information including a network variable identifier for said first node and said second node, said network variable identifier identifying that the value of the first variable is to be the value of the second variable, said connection information further including a third service class value, said third service class value being different from said first service class value and said second service class value; and
a second computer, being coupled to said network, communicating said connection information to said first node and said second node;
executing said first program on said first node, said first node having stored therein a value for said first variable while executing said first program;
executing said second program on said second node said second node having stored therein a value for said second variable while executing said second program;
while said second node is executing said second program and said first node is executing said first program, performing the steps of:

communicating the value of said second variable stored in said second node to said first node using said third service class: and updating the value of said first variable stored in said first node to the value of said second variable.

18. The method of claim 17 wherein said first computer and said second computer are the same computer.

19. The method of claim 17 wherein said configurable first service class value and said configurable second service class value correspond to an acknowledged service and wherein said third service class value is generated to correspond to an unacknowledged repeat service.

* * * * *

UNITED STATES PATENT AND TRADEMARK OFFICE
CERTIFICATE OF CORRECTION

PATENT NO. : 5,490,276            Page 1 of 3
DATED      : February 6, 1996
INVENTOR(S) : Robert A. Dolin, Jr., et. al.

It is certified that error appears in the above-indentified patent and that said Letters Patent is hereby corrected as shown below:

| | | |
|---|---|---|
| Col. 1, Line 39 | Delete "mounts" | Insert --amounts-- |
| Col. 1, Line 43 | Delete "carded" | Insert --carried-- |
| Col. 1, Line 59 | Delete "pans" | Insert --parts-- |
| Col. 2, Line 44 | Delete "fast" | Insert --first-- |
| Col. 5, Line 6 | Delete "Derailed" | Insert --Detailed-- |
| Col. 6, Line 31 | After "environment" | Insert --.-- |
| Col. 7, Line 51 | After the word "object" | Insert --.-- |
| Col. 7, Line 65 | Delete "dam" | Insert --data-- |
| Col. 8, Line 2 | Delete "dam" | Insert --data-- |
| Col. 10, Line 13 | Delete "mining" | Insert --turning-- |
| Col. 10, Line 20 | Delete "temperag" | Insert --temperature-- |
| Col. 10, Line 21 | Delete "temperag" | Insert --temperature-- |
| Col. 10, Line 36 | Delete "HI" | Insert --III-- |
| Col. 10, Line 50 | Delete "Set" | Insert --set-- |
| Col. 18, Line 58 | Delete "pan" | Insert --part-- |
| Col. 19, Line 63 | Delete "140" | Insert --I/O-- |
| Col. 19, Line 64 | Delete "140" | Insert --I/O-- |

UNITED STATES PATENT AND TRADEMARK OFFICE
CERTIFICATE OF CORRECTION

PATENT NO. : 5,490,276                              Page 2 of 3
DATED     : February 6, 1996
INVENTOR(S) : Robert A. Dolin, Jr., et. al.

It is certified that error appears in the above-indentified patent and that said Letters Patent is hereby corrected as shown below:

Col. 19, Line 66  Delete "10"           Insert --IO--
Col. 19, Line 67  Delete "10"           Insert --IO-- (2nd occur.)
Col. 20, Line 1   Delete "140"   Insert --I/O--
Col. 20, Line 5   Delete "140"   Insert --I/O--
Col. 20, Line 8   Delete "140"   Insert --I/O--
Col. 20, Line 9   Delete "140"   Insert --I/O--
Col. 20, Line 11  Delete "140"   Insert --I/O--
Col. 20, Line 19  Delete "140"   Insert --I/O--
Col. 20, Line 23  Delete "140"   Insert --I/O--
Col. 20, Line 63  After the word "event" Delete "," Insert --.--
Col. 23, Line 8   Delete "completer"    Insert --computer--
Col. 23, Line 28  Delete "."     Insert --;--
Col. 23, Line 37  Delete ":"     Insert --;--
Col. 23, Line 56  Delete ":"     Insert --;--
Col. 23, Line 61  Delete ":"     Insert --;--
Col. 24, Line 22  Delete ";"     Insert--:--
Col. 24, Line 38  After the word "program"      Insert --,--
Col. 24, Line 40  After the word "configurable" Insert --,--

UNITED STATES PATENT AND TRADEMARK OFFICE
CERTIFICATE OF CORRECTION

PATENT NO. : 5,490,276
DATED : February 6, 1996
INVENTOR(S) : Robert A. Dolin, Jr., et. al.

It is certified that error appears in the above-indentified patent and that said Letters Patent is hereby corrected as shown below:

Col. 24, Line 53 Delete "stare" Insert --state--

Col. 25, Line 24 Delete "complied" Insert --compiled--

Col. 25, Line 29 After the word "generating" Insert --,--

Col. 25, Line 40 After the word "configurable" Insert --,--

Col. 25, Line 43 Delete ":" Insert --;--

Col. 25, Line 45 Delete "nozzle" Insert --node--

Col. 25, Line 46 Delete ":" Insert --;--

Col. 26, Line 5 After the word "data" Insert --,--

Col. 26, Line 6 After the word "information" Insert --,--

Col. 26, Line 35 Delete "sham" Insert --share--

Signed and Sealed this

Second Day of July, 1996

BRUCE LEHMAN

*Attest:*

*Attesting Officer*    Commissioner of Patents and Trademarks